(12) United States Patent
Kim et al.

(10) Patent No.: US 12,203,402 B2
(45) Date of Patent: Jan. 21, 2025

(54) METHOD AND APPARATUS FOR PURIFYING EXHAUST GAS OF VESSEL AND VESSEL INCLUDING THE SAME

(71) Applicants: HANWHA OCEAN CO., LTD., Geoje-si (KR); HI AIR KOREA, Gimhae-si (KR)

(72) Inventors: Keun Bae Kim, Gimhae-si (KR); Gwang Hyun Lee, Busan (KR); Hyung Ju Roh, Busan (KR); Min Woo Lee, Ulsan (KR); Won Kyeong Son, Ulsan (KR); Byung Tak Nam, Geoje-si (KR); So Young Choi, Geoje-si (KR); Seung Min Jeon, Geoje-si (KR)

(73) Assignees: HANWHA OCEAN CO., LTD., Geoje-si (KR); HI AIR KOREA, Gimhae-si (KR)

( * ) Notice: Subject to any disclaimer, the term of this patent is extended or adjusted under 35 U.S.C. 154(b) by 0 days.

(21) Appl. No.: 18/566,667

(22) PCT Filed: Dec. 21, 2021

(86) PCT No.: PCT/KR2021/019545
§ 371 (c)(1),
(2) Date: Dec. 4, 2023

(87) PCT Pub. No.: WO2022/260230
PCT Pub. Date: Dec. 15, 2022

(65) Prior Publication Data
US 2024/0287924 A1    Aug. 29, 2024

(30) Foreign Application Priority Data

Jun. 9, 2021   (KR) .................. 10-2021-0075099
Nov. 17, 2021  (KR) .................. 10-2021-0158853

(51) Int. Cl.
*F01N 3/04*           (2006.01)

(52) U.S. Cl.
CPC ............ *F01N 3/04* (2013.01); *F01N 2590/02* (2013.01)

(58) Field of Classification Search
CPC ..... F01N 2610/1406; F01N 2610/1433; F01N 3/04; C01C 1/22; Y02C 20/40;
(Continued)

(56) References Cited

FOREIGN PATENT DOCUMENTS

| JP | 6113774 B2 | * | 4/2017 |
| KR | 101489657 B1 | * | 2/2015 |

(Continued)

OTHER PUBLICATIONS

JP-6113774B2 Machine Translation (Year: 2015).*

(Continued)

*Primary Examiner* — Anthony Ayala Delgado
(74) *Attorney, Agent, or Firm* — Park, Kim & Suh, LLC

(57) ABSTRACT

The present invention provides method and apparatus for purifying exhaust gas of a vessel and a vessel including the same, in which a risk for a vessel and crew of being exposed to ammonia gas used to collect carbon dioxide included in exhaust gas emitted from a vessel may be minimized and an ammonia solution may be recycled and reused to collect carbon dioxide, in order to satisfy regulations on discharge of exhaust gas by the IMO. Also, the present invention provides an apparatus 1000 for purifying exhaust gas of a vessel and a method of purifying exhaust gas of a vessel using the same, in which carbon dioxide and sulfur dioxide included in exhaust gas emitted from a vessel may be collected by using a reaction solution and may be changed into a substance that does not affect the environment so as to be stored and transported to land.

19 Claims, 10 Drawing Sheets

(58) Field of Classification Search
CPC .............. C01B 32/50; B01D 2252/102; B01D 2252/103; B01D 2257/504; B01D 2258/0283; B01D 53/62
See application file for complete search history.

(56) References Cited

FOREIGN PATENT DOCUMENTS

| | | |
|---|---|---|
| KR | 10-2232540 B1 | 3/2021 |
| KR | 10-2232553 B1 | 3/2021 |
| KR | 10-2232587 B1 | 3/2021 |
| KR | 10-2231448 B1 | 4/2021 |
| KR | 10-2300724 B1 | 9/2021 |
| KR | 10-2306217 B1 | 9/2021 |
| KR | 10-2313858 B1 | 10/2021 |

OTHER PUBLICATIONS

English Translation KR 101489657 B1 (Year: 2015).*
International Search Report in International Application No. PCT/KR2021/019545, dated Apr. 8, 2022, 3 pages.

* cited by examiner

METHOD AND APPARATUS FOR PURIFYING EXHAUST GAS OF VESSEL AND VESSEL INCLUDING THE SAME

CROSS-REFERENCE TO RELATED APPLICATIONS

This application is a National Phase Application of PCT International Application No. PCT/KR2021/019545, which was filed on Dec. 21, 2021, and which claims priority from Korean Patent Application No. 10-2021-0075099 filed on Jun. 9, 2021, and Korean Patent Application No. 10-2021-0158853 filed on Nov. 17, 2021. The disclosures of the above patent application are incorporated herein by reference in their entirety.

TECHNICAL FIELD

The present invention relates to method and apparatus for purifying exhaust gas of a vessel and a vessel including the same, in which carbon dioxide included in exhaust gas emitted from a vessel is absorbed and solidified to be transported to land, and more particularly, to method and apparatus for purifying exhaust gas of a vessel and a vessel including the same, in which ammonia water used as a reaction solution of a wet scrubber is recycled and reused and thereby, a tank for storing ammonia gas is not included in a vessel so that a risk for a vessel and crew of being exposed to ammonia gas may be removed.

Also, the present invention relates to method and apparatus for purifying exhaust gas of vessel and a vessel including the same, in which carbon dioxide and sulfur dioxide included in exhaust gas emitted from a vessel is absorbed and solidified to be easily transported to land.

BACKGROUND ART

Pollutants included in exhaust gas emitted from a vessel include SOx, NOx, $CO_2$, and the like which may harm to humans. Also, when such pollutants are released into the atmosphere without being filtered, environmental pollution may be caused.

In this regard, the UN entrusted regulation problems on emission of exhaust gas of vessels which sail around the world to the International Maritime Organization (IMO). The IMO proceeds with various exhaust gas reduction plans which aim to reduce emission of exhaust gas from a vessel by 40% until 2030 and by 50% until 2050, compared with 2008.

Accordingly, the shipping industry and the shipbuilding industry are required to have solutions regarding reduction in emission of carbon dioxide which is major greenhouse gas.

Meanwhile, according to the International Energy Agency (IEA), global emissions of $CO_2$ due to fuel combustion is 32.3 billion tons in 2016. Here, $CO_2$ emissions due to combustion of marine bunker oil is 6.8 t which is 2.1% of total emissions.

In Korea, a medium- and long-term road map is established and research business is executed to achieve a greenhouse gas reduction goal of 40% suggested by the IMO and technologies for reducing greenhouse gas emitted from a vessel are being developed and proceeded.

In particular, in 2050, as emission of carbon dioxide is aimed at reducing more than 50% of emissions in 2008, technologies that do not emit $CO_2$ or collect emitted $CO_2$ draw attention.

In this regard, technologies that do not release carbon dioxide, which is a major pollutant included in exhaust gas of a vessel, into the atmosphere, collect, store, and reuse carbon dioxide greatly draw attention and such technologies are referred to as Carbon dioxide Capture and Storage (hereinafter, referred to as CCS) which includes a wet-type absorption process, a adsorption process, and a membrane separation process as representative technique. Here, the wet-type absorption process may be a collecting technology that is the closest to commercialization of CCS, as technical maturity is high in onshore plant and mass disposal of $CO_2$ is available. A reaction solution of the wet-type absorption process mainly includes an amine series and ammonia gas.

The above ammonia gas is toxic gas which has strong corrosiveness. If people breathe ammonia gas in, nose, throat, and airway mucosa are stimulated and got burned. Also, hemoptysis, vomiting, and nose bleeding may be caused.

Accordingly, there is an urgent demand for the development of technologies that may remove a risk of an ammonia gas leak from an enclosed facility such as a vessel, absorb carbon dioxide included in exhaust gas emitted from a vessel, change the absorbed carbon dioxide into a substance that does not affect the environment, emit or store the substance so as to be transported to land.

In addition, pollutants included in exhaust gas emitted from a vessel include carbon dioxide (hereinafter, referred to as $CO_2$), sulfur dioxide (hereinafter, referred to as $SO_2$), and the like which may harm to humans. Also, when such pollutants are released into the atmosphere without being filtered, environmental pollution may be caused.

In this regard, the UN entrusted regulation problems on emission of exhaust gas of vessels which sail around the world to the IMO. The IMO proceeds with various exhaust gas reduction plans which aim to reduce emission of exhaust gas from a vessel by 40% until 2030 and by 50% until 2050, compared with 2008.

In Korea, a medium- and long-term road map is established and research business is executed to achieve a greenhouse gas reduction goal in 2030 suggested by the IMO so that pre-emptive entry to an eco-vessel market is now needed with active technology development for reducing greenhouse gas emitted from a vessel.

Methods developed up to date to solve problems regarding exhaust gas of a vessel in the shipping business firstly include a use of low sulfur fuel oil as suggested by the IMO. However, if such method is chosen, economic disadvantage may occur due to a significant price difference between low sulfur fuel oil and high sulfur fuel oil.

A second method includes changing SOx into sulfurous acid or sulfuric acid with low concentration by installing and using a scrubber that dissolves pollutants included in exhaust gas of an engine with a large amount of water and then, discharging the sulfurous acid or sulfuric acid in the sea or changing the sulfurous acid or sulfuric acid into sodium or calcium salts, storing and disusing the sodium or calcium salts. However, in this method, there is a rise in demand for high-priced special steel and a big size scrubber needs to be equipped in a vessel so as to cause additional economic burden.

In this regard, various types of apparatuses for reducing exhaust gas of a vessel have been developed to absorb exhaust gas emitted from a vessel and to reduce pollutants included in the exhaust gas. Apparatuses for removing or absorbing $CO_2$ and $SO_2$ are installed and operated on land, however, such apparatuses have never commercialized in a vessel. Therefore, there is a demand for the development of technologies that may absorb pollutants included in exhaust gas emitted from a vessel, change the absorbed carbon dioxide into a substance that does not affect the environment, emit or store the substance so as to be transported to land.

DETAILED DESCRIPTION OF THE INVENTION

Technical Problem

The present invention provides method and apparatus for purifying exhaust gas of a vessel and a vessel including the same, in which ammonia water, which is a reaction solution used to collect carbon dioxide included in exhaust gas emitted from a vessel, may be recycled and reused so that exposure to ammonia gas may be minimized for a vessel and crew.

Also, the present invention provides method and apparatus for purifying exhaust gas of a vessel and a vessel including the same, in which $CO_2$ and $SO_2$, which are pollutants included in exhaust gas emitted from a vessel, may be collected by using a reaction solution, the collected $CO_2$ and $SO_2$ may be changed into a substance that does not affect the environment, and the substance may be stored and transported to land.

Technical Solution

An apparatus 100 for purifying exhaust gas of a vessel according to a first embodiment of the present invention is equipped with a vessel to treat exhaust gas generated from an exhaust gas generator and includes: a wet scrubber 110 which reacts exhaust gas generated from an exhaust gas generator included in a vessel with a reaction solution to convert carbon dioxide included in exhaust gas into ammonium salt; an inlet 115 which makes inflow of exhaust gas into the inside of the wet scrubber 110 and an outlet 112 which discharges exhaust gas to the outside of the wet scrubber 110; a circulation tank 120 which produces a reaction solution reacted with exhaust gas and supplies the produced reaction solution to the wet scrubber 110, a transfer pump 123 which transfers ammonium salt produced by reacting carbon dioxide included in exhaust gas flowed through the inlet 115 with the reaction solution, a mixing tank 130 which includes an impeller 135 that produces slurry including carbonate and an ammonia solution by reacting ammonium salt transferred from the wet scrubber 110 with bivalent metal oxide or bivalent metal hydroxide, the sludge pump 131 which transfers sludge from the mixing tank 130 to a solid-liquid separator 150, a solid-liquid separator 150 which separates precipitate such as carbonate and an ammonia solution from the sludge transferred from the mixing tank 130; a first storage tank 151 which stores an ammonia solution separated from the solid-liquid separator 150; a second storage tank 160 which stores precipitate such as carbonate separated from the solid-liquid separator 150; a third storage tank 140 which supplies bivalent metal oxide or bivalent metal hydroxide; and a transfer pump 152 which transfers an ammonia solution stored in the first storage tank 151 to the circulation tank 120, if needed, bivalent metal oxide may be calcium oxide or magnesium oxide, the bivalent metal hydroxide may be calcium hydroxide or magnesium hydroxide, and the bivalent metal oxide or bivalent metal hydroxide may be supplied in the form of powder, an aqueous solution, or sludge.

Also, a method of purifying exhaust gas of a vessel includes: i) reacting carbon dioxide included in exhaust gas emitted from a vessel with water to produce carbonic acid ($H_2CO_3$) in step 1; ii) reacting carbonic acid produced in step 1 with an ammonia solution to produce ammonium hydrogen carbonate ($NH_4HCO_3$) in step 2; iii) reacting ammonium hydrogen carbonate ($NH_4HCO_3$) produced in step 2 with an ammonia solution to produce ammonium carbonate (($NH_4)_2CO_3$) in step 3; iv) reacting ammonium hydrogen carbonate ($NH_4HCO_3$) and ammonium carbonate ($NH_4)_2CO_3$ with bivalent metal oxide or bivalent metal hydroxide to produce carbonate and an ammonia solution in step 4; and v) re-supplying the ammonia solution produced in step 4 to step 2 in step 5, an insufficient ammonia solution may be generated through a reaction of an inorganic compound with calcium hydroxide and may be filled, the inorganic compound may include at least one selected from a group consisting of ammonium bicarbonate ($NH_4HCO_3$), ammonium carbonate (($NH_4)_2CO_3$), ammonium bisulfite ($NH_4HSO_4$), ammonium sulfate (($NH_4)_2SO_4$), ammonium nitrate ($NH_4NO_3$), ammonium chloride ($NH_4Cl$), ammonium sulfamate ($NH_4SO_3NH_2$), and ammonium sulfite (($NH_4)_2SO_3$), and the amount of the inorganic compound may needs to be put by 1.0 to 2.0 times at the molar ratio of insufficient ammonia solution.

Also, an apparatus 1000 for purifying exhaust gas of a vessel according to a second embodiment of the present invention is equipped with a vessel to treat exhaust gas generated from an exhaust gas generator and includes: a wet scrubber 1100 which reacts exhaust gas generated from an exhaust gas generator with water and a reaction solution to change carbon dioxide and sulfur dioxide included in exhaust gas into mineral salt; an eleventh tank 1200 which stores the reaction solution reacted with exhaust gas and supplies the reaction solution to the wet scrubber 1100; a transfer pump 1230 which is included in the lower part of the wet scrubber 1100 and transfers a reaction solution including mineral salt to the twelfth tank 1300; a twelfth tank 1300 which reacts mineral salt included in a reaction solution including mineral salt produced in the wet scrubber 1100 with bivalent metal oxide or bivalent metal hydroxide to produce a reaction solution and produces sludge including carbonate and sulphate; a thirteenth tank 1400 which stores and supplies bivalent metal oxide or bivalent metal hydroxide to the twelfth tank 1300; a solid-liquid separator 1500 which separates carbonate and sulphate from the sludge transferred from the twelfth tank 1300; a sludge pump 1310 which transfers carbonate and sulphate to the solid-liquid separator 1500 from the twelfth tank 1300; a fourteenth tank 1600 which stores carbonate and sulphate separated from the solid-liquid separator 1500; and a fifteenth tank 1510 which stores a recycle reaction solution separated from the solid-liquid separator 1500 and supplies the recycle reaction solution to the eleventh tank 1200, the reaction solution may be a sodium hydroxide aqueous solution, an ammonia aqueous solution, or a mixture thereof, the reaction solution may further include at least any one of a lithium hydroxide aqueous solution, a potassium hydroxide aqueous solution, a calcium hydroxide aqueous solution, and a magnesium hydroxide aqueous solution as an auxiliary reaction solution, the concentration of the lithium hydroxide aqueous solution and the potassium hydroxide aqueous solution may be below 15 weight % compared with the total reaction solution, and the concentration of the calcium hydroxide aqueous solution and the magnesium hydroxide aqueous solution may be below 2 weight % compared with the total reaction solution.

Also, a method of purifying exhaust gas of a vessel according to a second embodiment of the present invention includes: includes i) reacting carbon dioxide included in exhaust gas emitted from a vessel with water to produce carbonic acid ($H_2CO_3$) in step a (operation S100); ii) reacting sulfur dioxide included in exhaust gas with water to produce sulfurous acid ($H_2SO_3$) and sulfuric acid ($H_2SO_4$) in step b (operation S200); iii) reacting carbonic acid ($H_2CO_3$) produced in step a (operation S100) with sulfurous acid ($H_2SO_3$), sulfuric acid ($H_2SO_4$) produced in step b (operation S200), and a reaction solution to produce a reaction solution including mineral salt in step c (operation S300); iv) reacting the reaction solution including mineral salt produced in step c (operation S300) with bivalent metal oxide or bivalent metal hydroxide to produce carbonate and sulphate and to recycle a reaction solution at the same time in step d (operation S500); and v) separating carbonate and sulphate included in the recycled reaction solution by using the solid-liquid separator 1500 in step e (operation S600), the reaction solution may be a sodium hydroxide aqueous solution, an ammonia aqueous solution, or a mixture thereof, 0.1 to 20 weight % of sodium hydroxide may be included in a sodium hydroxide aqueous solution, 0.1 to 25 weight % of ammonia may be included in an ammonia aqueous solution, the reaction solution may further include at least any one of a lithium hydroxide aqueous solution, a potassium hydroxide aqueous solution, a calcium hydroxide aqueous solution, and a magnesium hydroxide aqueous solution as an auxiliary reaction solution, the concentration of the lithium hydroxide aqueous solution and the potassium hydroxide aqueous solution may be below 15 weight % compared with the total reaction solution, and the concentration of the calcium hydroxide aqueous solution and the magnesium hydroxide aqueous solution is below 2 weight % compared with the total reaction solution.

The potassium hydroxide aqueous solution may include 20 weight % or below of potassium hydroxide and the lithium hydroxide aqueous solution may include 15 weight % or below of lithium hydroxide, the reaction solution may be produced by using pure water or seawater, the bivalent metal oxide may be calcium oxide or magnesium oxide, the bivalent metal hydroxide may be calcium hydroxide or magnesium hydroxide, and the bivalent metal oxide or bivalent metal hydroxide may be supplied in the form of powder, an aqueous solution, or sludge. In the method of purifying exhaust gas of a vessel, as a process or filling the reaction solution, oxidation-reduction potential (ORP), acidity (pH), or conductivity of the reaction solution may be measured to measure the concentration of the reaction solution so as to fill a reaction solution lost while operating.

Effect of the Invention

According to an apparatus 100 for purifying exhaust gas of a vessel in a first embodiment of the present invention, carbon dioxide included in exhaust gas emitted from a vessel is collected and solidified and thereby, may be easily stored and transferred to land. Also, self-recycling and self-reuse of an ammonia solution, which is a reaction solution, used in a wet scrubber 110 to absorb carbon dioxide are available in a vessel so that a risk for a vessel and crew of being exposed to ammonia gas may be prevented. In this regard, consumption of ammonia ($NH_3$) may be reduced and thereby, a cost of purifying exhaust gas of a vessel may be significantly reduced. Also, carbon dioxide included in exhaust gas emitted from a vessel is absorbed so that regulations on discharge of exhaust gas by the IMO may be satisfied and release of substances which may affect the marine environmental pollution may be minimized.

In addition, according to an apparatus for purifying exhaust gas of a vessel in a second embodiment of the present invention, contaminants included in exhaust gas emitted from a vessel are collected and solidified and thereby, may be easily stored and transferred to land. Also, self-recycling and self-reuse of a reaction solution used in a wet scrubber to absorb contaminants are available in a vessel so that a cost of purifying exhaust gas of a vessel may be significantly reduced.

Moreover, as oxidation-reduction potential (ORP), pH, or conductivity of the reaction solution is measured, a lost reaction solution may be filled and thereby, higher absorption efficiency may be obtained. In particular, contaminants included in exhaust gas emitted from a vessel are absorbed so that regulations on discharge of exhaust gas by the IMO may be satisfied and release of substances which may affect the marine environmental pollution may be minimized.

BEST MODE OF THE INVENTION

Figure 1:
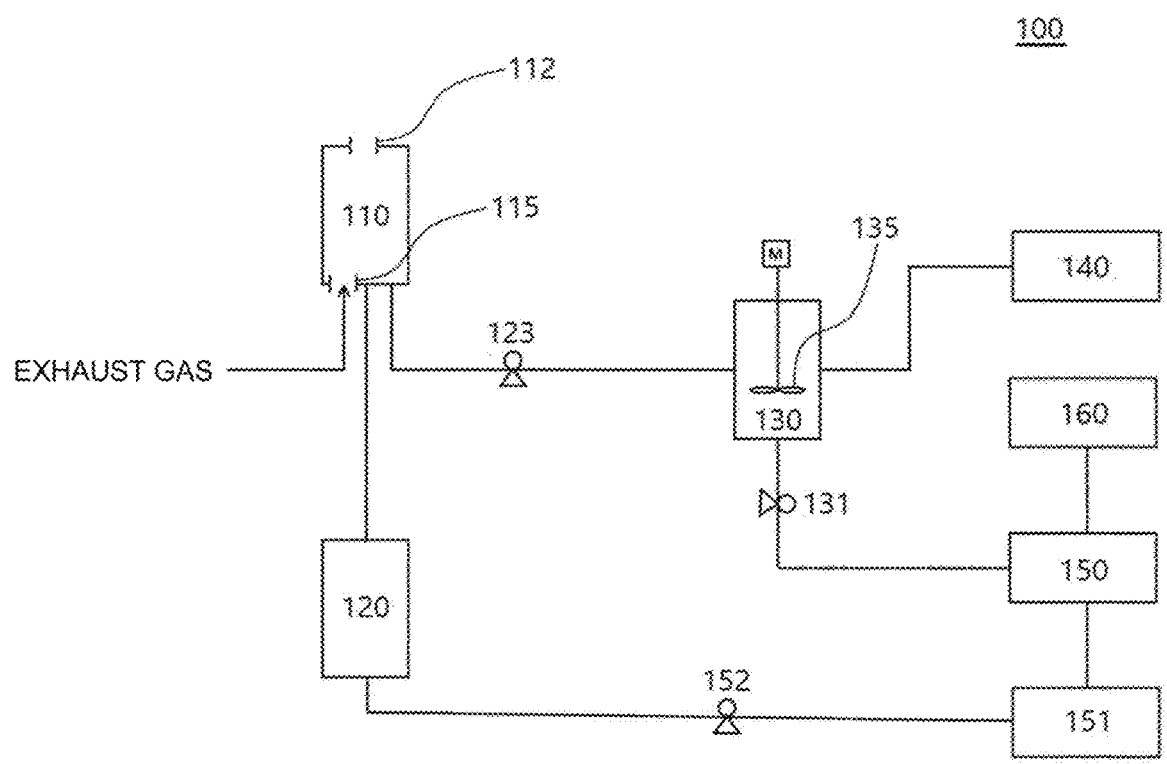
FIG. 1 is a block diagram schematically illustrating a apparatus 100 for purifying exhaust gas of a vessel according to a first embodiment of the present invention.

It will be understood that the terms "comprises," "comprising," "includes," and/or "including," when used herein, specify the presence of stated features, integers, steps, elements, components, and/or combinations thereof, but do not preclude the presence or addition of one or more other features, integers, steps, elements, components, and/or combinations thereof.

Also, unless defined differently, all terms used in the description including technical and scientific terms have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Embodiments of the present invention will be described more fully below with reference to the accompanying drawings. In the description, like reference numerals denote like elements to easily understand the invention and overlapped description regarding the same elements will be omitted.

Figure 2:
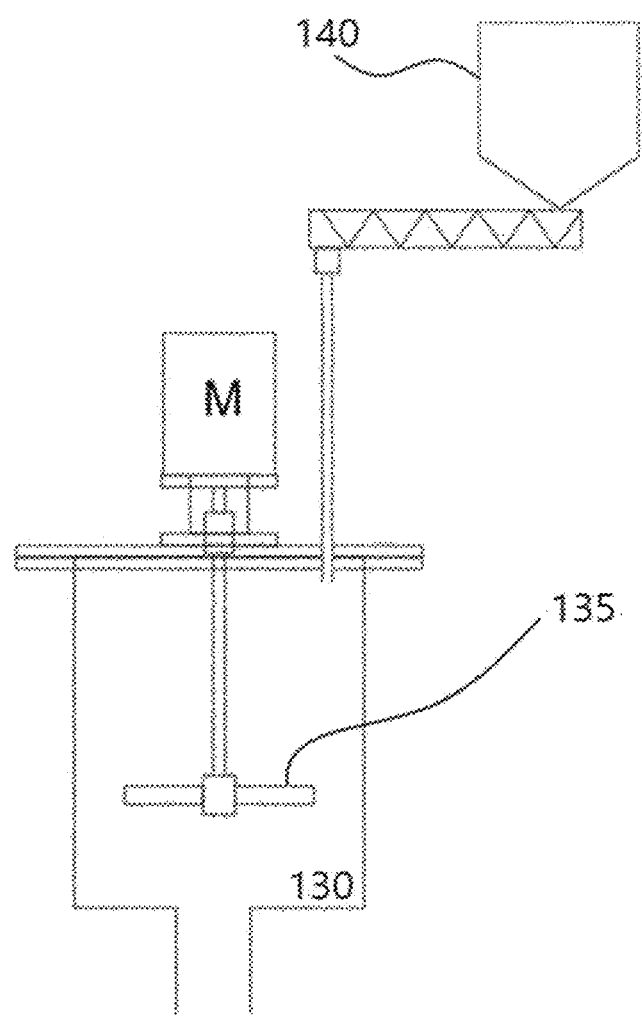
FIG. 2 is a block diagram of a third storage tank 140 which stores and supplies a bivalent metal oxide or a bivalent metal hydroxide according to a first embodiment of the present invention.
Figure 3:
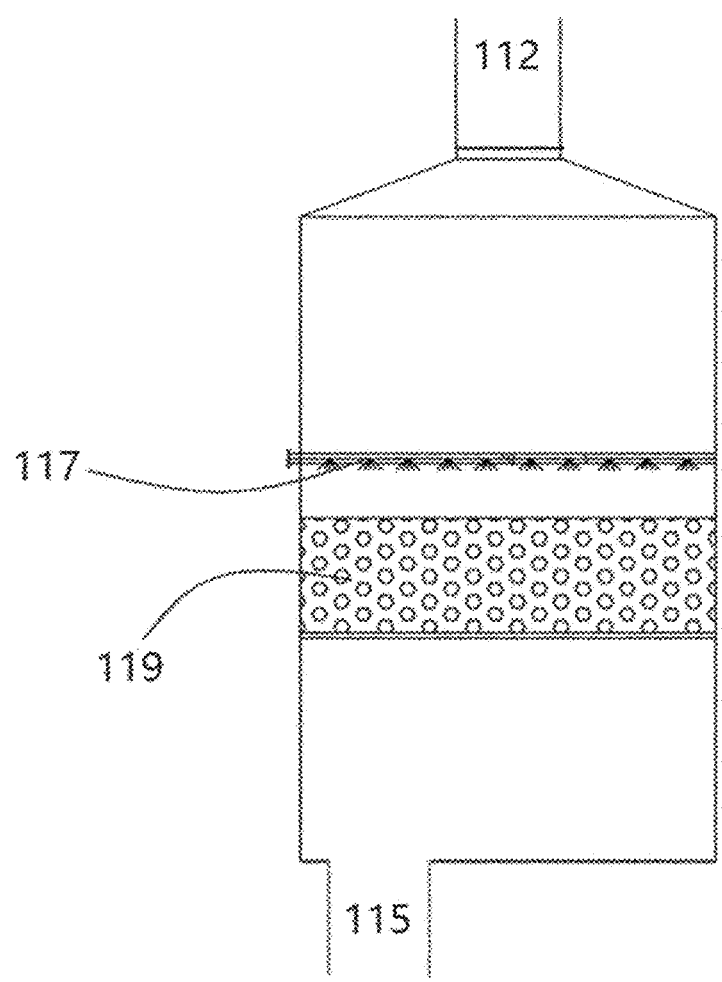
FIG. 3 is a block diagram of a wet scrubber 110 according to a first embodiment of the present invention.
Figure 4:
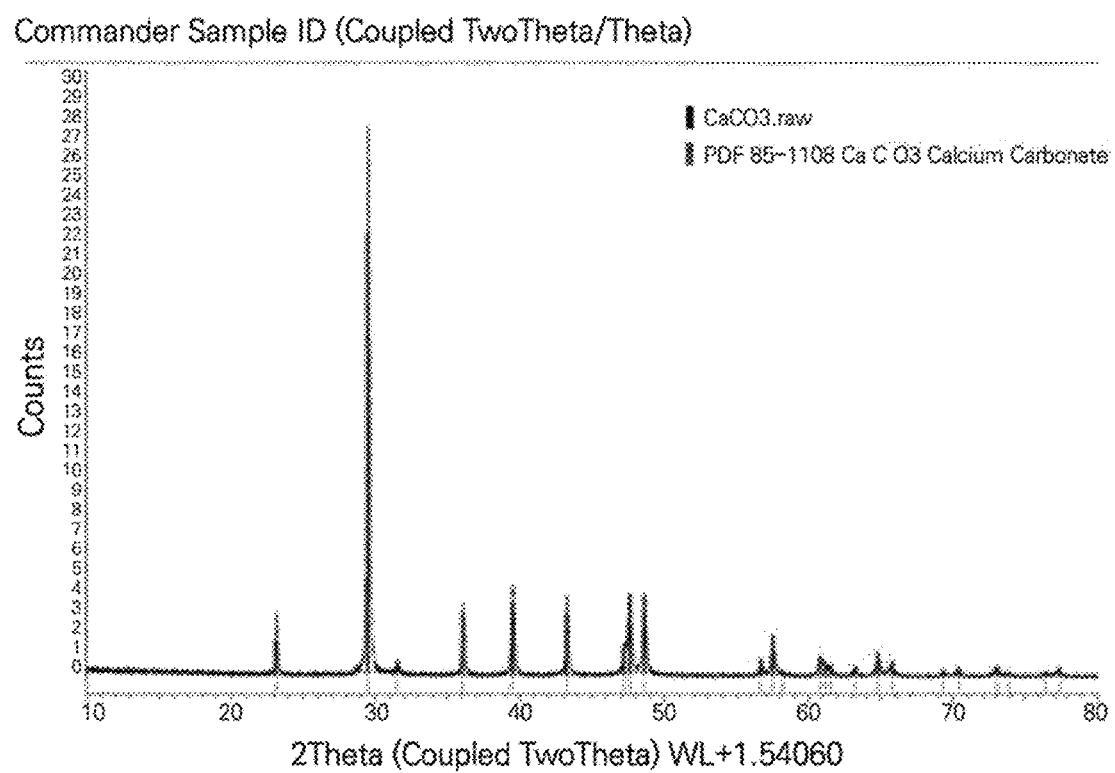
FIG. 4 is an analysis chart of powder X-Ray Diffraction (XRD) regarding a solid generated from the apparatus 100 for purifying exhaust gas of a vessel according to a first embodiment of the present invention.

Hereinafter, an apparatus 100 for purifying exhaust gas of a vessel and a method of purifying exhaust gas of a vessel by using the same according to a first embodiment of the present invention will be described in more detail with reference to the accompanying drawings. FIG. 1 is a block diagram schematically illustrating an apparatus 100 for purifying exhaust gas of a vessel according to a first embodiment of the present invention, FIG. 2 is a block diagram of a third storage tank 140 which stores and supplies a bivalent metal oxide or a bivalent metal hydroxide according to a first embodiment of the present invention, FIG. 3 is a block diagram of a wet scrubber 110 according to a first embodiment of the present invention, and FIG. 4 is an analysis chart of powder X-Ray Diffraction (XRD) regarding a solid generated from the apparatus 100 for purifying exhaust gas of a vessel according to a first embodiment of the present invention.

Referring to FIG. 1, the apparatus 100 for purifying exhaust gas of a vessel according to the first embodiment of the present invention may include the wet scrubber 110; an inlet 115, an outlet 112; a circulation tank 120, a transfer pump 123, a mixing tank 130, a sludge pump 131, a solid-liquid separator 150; a first storage tank 151; a second storage tank 160; and a transfer pump 152, wherein the wet scrubber 110 reacts exhaust gas generated from an exhaust gas generator included in a vessel with a reaction solution to convert carbon dioxide included in exhaust gas into ammonium salt, the inlet 115 makes inflow of exhaust gas into the inside of the wet scrubber 110 and the outlet 112 discharges exhaust gas to the outside of the wet scrubber 110; the circulation tank 120 produces a reaction solution reacted with exhaust gas and supplies the produced reaction solution to the wet scrubber 110, the transfer pump 123 transfers ammonium salt produced by reacting carbon dioxide included in exhaust gas flowed through the inlet 115 with the reaction solution, the mixing tank 130 includes an impeller that produces slurry including carbonate and an ammonia solution by reacting ammonium salt transferred from the wet scrubber 110 with bivalent metal oxide or bivalent metal hydroxide, the sludge pump 131 transfers sludge from the mixing tank 130 to the solid-liquid separator 150, the solid-liquid separator 150 separates precipitate such as carbonate and an ammonia solution from the sludge transferred from the mixing tank 130, the first storage tank 151 stores an ammonia solution separated from the solid-liquid separator 150, the second storage tank 160 stores precipitate such as carbonate separated from the solid-liquid separator 150, and the transfer pump 152 transfers an ammonia solution stored in the first storage tank 151 to the circulation tank 120, if needed.

The above described apparatus 100 for purifying exhaust gas of a vessel according the first embodiment of the present invention may be equipped with a vessel. That is, the exhaust gas generator may be included in the hull of a vessel and may be, for example, a main engine, a power generation engine, or a boiler. However, the exhaust gas generator is not particularly restricted and may be any well-known apparatus that is included in a vessel and emits exhaust gas.

More specifically, in the apparatus 100 for purifying exhaust gas of a vessel according to the first embodiment of the present invention, the inlet 115 is included at one side of the wet scrubber 110 and exhaust gas generated after fuel is combusted in the exhaust gas generator is flowed into the inlet 115.

Also, the wet scrubber 110 includes the outlet 112 at one side thereof so that flowed exhaust gas is processed and then, is discharged to the outside through the outlet 112.

According to the first embodiment of the present invention, the wet scrubber 110 reacts exhaust gas inflowed through the inlet 115 with a reaction solution to produce ammonium salt. Here, in the wet scrubber 110, a process of spraying the reaction solution which absorbs gaseous contaminants included in exhaust gas is circulated and repeated and contaminants are precipitated or deposited on the lower part of the wet scrubber 110 as in the form of sludge. As described above, the wet scrubber 110 may include the inlet 115 and the outlet 112 for inflow and discharge of exhaust gas.

In the wet scrubber 110, a reaction solution supply line 117 is included to spray a reaction solution downward from the upper part of the inside of the wet scrubber 110 as illustrated in FIG. 3. Here, the reaction solution supply line 117 includes a plurality of spray nozzles (not illustrated) so as to spray the reaction solution downward.

Here, exhaust gas moves backwardly from the lower part to the upper part with respect to the reaction solution sprayed downward from the spray nozzles.

Also, the wet scrubber 110 includes a filling member 119 having a high surface area at the lower part of the reaction solution supply line 117 as illustrated in FIG. 3. As the exhaust gas passes through the filling member 119, contact efficiency with the reaction solution increases and thereby, removal efficiency of contaminants included in the exhaust gas may be increased.

In addition, according to the first embodiment of the present invention, the circulation tank 120 produces a reaction solution that reacts with the carbon dioxide by using a recycle ammonia solution stored in the first storage tank 151 and supplies the reaction solution to the wet scrubber 110.

Here, the circulation tank 120 appropriately mixes the recycled ammonia solution and water to produce an ammonia solution which is a reaction solution of carbon dioxide.

In addition, the wet scrubber 110 includes the transfer pump 123 at the lower part thereof to transfer ammonium salt produced after being reacted with carbon dioxide included in the exhaust gas to the mixing tank 130 as illustrated in Chemical Formulas 1 through 4 below.

The mixing tank 130 reacts ammonium salt transferred from the wet scrubber 110 by the transfer pump 123 with bivalent metal oxide or bivalent metal hydroxide to recycle an ammonia solution and to form slurry including carbonate.

According to the first embodiment of the present invention, bivalent metal oxide may be calcium oxide (CaO) or magnesium oxide (MgO) and bivalent metal hydroxide may be calcium hydroxide $Ca(OH)_2$ or magnesium hydroxide $Mg(OH)_2$.

According to the first embodiment of the present invention, the mixing tank 130 may include an impeller 135 operated by a motor as illustrated in FIG. 2 in order to easily mix the ammonium salt with bivalent metal oxide or bivalent metal hydroxide.

In addition, according to the first embodiment of the present invention, ammonium salt reacts with bivalent metal oxide or bivalent metal hydroxide and sludge including carbonate and an ammonia solution may be produced in the mixing tank 130 as illustrated in Chemical Formulas 5 through 6.

The mixing tank 130 may include the sludge pump 131 at one side thereof to transfer sludge including carbonate produced in the mixing tank 130, after a reaction is completed as above.

Moreover, the apparatus 100 for purifying exhaust gas of a vessel according to the present invention may include the solid-liquid separator 150 to separate sludge including carbonate and an ammonia solution produced after a reaction is completed as illustrated in Chemical Formulas 7 through 12.

According to the first embodiment of the present invention, precipitate such as carbonate and the produced ammonia solution are mixed in the sludge so that the ammonia solution and the sludge need to be separated from each other to reuse the ammonia solution as a reaction solution afterward.

That is, as the sludge includes 20 to 50 weight % of the ammonia solution, various techniques or apparatuses for separating the ammonia solution from the sludge are suggested. Here, the solid-liquid separator 150 may be a representative apparatus.

Such a solid-liquid separator 150 may be in a filter press type or a belt press type. The filter press type or the belt press type solid-liquid separator 150 is installed for a filter cloth belt to pass through a plurality of rollers so that sludge is inserted into the filter cloth belt, transferred, and is pressurized by the rollers. Accordingly, the ammonia solution may be separated from the sludge.

According to the first embodiment of the present invention, the ammonia solution transfer pump 152 which transfers the ammonia solution from the first storage tank 151 to the circulation tank 120 may be further included to reuse the ammonia solution separated from the solid-liquid separator 150, when carbon dioxide included in exhaust gas is collected.

The above described apparatus 100 for purifying exhaust gas of a vessel according the first embodiment of the present invention may be equipped with a vessel. That is, the exhaust gas generator used to generate the exhaust gas may be included in the hull of a vessel and may be, for example, a main engine, a power generation engine, or a boiler. However, the exhaust gas generator is not particularly restricted and may be any well-known apparatus that emits exhaust gas.

In the exhaust gas generator, bunker C oil may be used as fuel. Bunker C oil which is vessel fuel has high calorific value and efficiency while in combustion and thereby, great amounts of energy may be generated. That is, compared with the calorific value of coal which is 5,000 to 7,000 kcal/kg, the calorific value of bunker C oil is 10,000 to 11,000 kcal/kg, which is about 2 times higher than that of coal.

Also, bunker C oil is cheaper than crude oil and thereby, is used a lot in a vessel or power plant.

In general, bunker C oil is composed of hydrocarbon compounds with carbon number of above 13, easily generates contaminants during combustion, and particularly includes a lot of environmental pollutants including sulfur.

A method of recycling and reusing an ammonia solution, which is used as a reaction solution for collecting carbon dioxide included in exhaust gas, by using bivalent metal oxide or bivalent metal hydroxide in the apparatus 100 for purifying exhaust gas of a vessel according to the first embodiment of the present invention will be described in more detail below with reference to FIG. 2.

That is, a reaction of an ammonia solution which is a reaction solution with carbon dioxide, wherein the carbon dioxide is contaminant included in exhaust gas generated from the exhaust gas generator included in a vessel, is as in Chemical Formula 1 through Chemical Formula 4 below. In general, an ammonia solution is produced by dissolving ammonia gas in water. Here, solubility of ammonia gas to water is about 29 to 30 weight %. Accordingly, about 70 weight % of water exists in the ammonia solution.

Therefore, carbon dioxide included in exhaust gas reacts with water to produce carbonic acid as in Chemical Formula 1 (step 1). Here, water reacting with carbon dioxide may exist in the ammonia solution.

$$CO_2 + H_2O \rightarrow H_2CO_3 \quad \text{(Chemical Formula 1)}$$

$$NH_4OH + H_2CO_3 \rightarrow NH_4HCO_3 + H_2O \quad \text{(Chemical Formula 2)}$$

$$NH_4OH + NH_4HCO_3 \rightarrow (NH_4)_2CO_3 + H_2O \quad \text{(Chemical Formula 3)}$$

$$2NH_4OH + H_2CO_3 \rightarrow (NH_4)_2CO_3 + 2H_2O \quad \text{(Chemical Formula 4)}$$

As in Chemical Formula 2, carbonic acid reacts with an ammonia solution to produce ammonium hydrogen carbonate ($NH_4HCO_3$) and water (step 2). Also, ammonium hydrogen carbonate ($NH_4HCO_3$) produced in Chemical Formula 2 reacts with an ammonia solution to produce ammonium carbonate ($(NH_4)_2CO_3$) and water as in Chemical Formula 3 (step 3).

As above, when ammonium hydrogen carbonate ($NH_4HCO_3$) and ammonium carbonate ($NH_4)_2CO_3$ which are reaction products of carbon dioxide and an ammonia solution are removed and an ammonia solution is continuously supplied to the wet scrubber 110, carbon dioxide which is contaminant included in exhaust gas generated from a vessel may be continuously removed.

According to the prior art, a large amount of ammonia gas used to produce the ammonia solution needs to be stored in a vessel, in order to continuously supply an ammonia solution which is a reaction solution to the wet scrubber 110. However, when a large amount of ammonia gas is stored in a vessel and the vessel is run, there is a risk that ammonia gas is exposed.

In order to solve such problem, ammonium hydrogen carbonate ($NH_4HCO_3$) and ammonium carbonate ($NH_4)_2CO_3$ which are reaction products of carbon dioxide and an ammonia solution, which is the reaction solution, react with bivalent metal oxide or bivalent metal hydroxide to be recycled as sludge including carbonate and an ammonia solution in the first embodiment of the present invention (step 4). Also, the ammonia solution and sludge are separated from each other and thereby, the ammonia solution may be reused as a reaction solution for collecting carbon dioxide included in exhaust gas (step 5).

In addition, as sludge including carbonate is solidified, the solidified sludge may be easily and safely stored in a vessel.

That is, a method of solidifying sludge including carbonate is the safest method of storing carbon dioxide and thereby, there is no concern about re-discharge of carbon dioxide.

A reaction of recycling an ammonia solution by reacting ammonium hydrogen carbonate and ammonium carbonate, which are products generated after carbon dioxide reacts with ammonia solution as a reaction solution, with calcium hydroxide which is bivalent metal hydroxide is as in Chemical Formula 5 through Chemical Formula 6.

$$NH_4HCO_3 + Ca(OH)_2 \rightarrow NH_4OH + CaCO_3 + H_2O \quad \text{(Chemical Formula 5)}$$

$$(NH_4)_2CO_3 + Ca(OH)_2 \rightarrow 2NH_4OH + CaCO_3 \quad \text{(Chemical Formula 6)}$$

As described above, sludge produced by reacting an ammonia solution, which is a reaction solution, with ammonium hydrogen carbonate or ammonium carbonate is analyzed with X-ray diffraction (XRD) and the result is shown in FIG. 4. In FIG. 4, it is identified that the produced sludge is calcium carbonate.

As described above, according to another example of the first embodiment of the present invention, Chemical Formula which recycles an ammonia solution by reacting ammonium hydrogen carbonate and ammonium carbonate, which are products generated after carbon dioxide reacts with ammonia solution as a reaction solution, with calcium oxide which is bivalent metal oxide is as in Chemical Formulas 7 and 8 below.

$$NH_4HCO_3 + CaO \rightarrow NH_4OH + CaCO_3 \quad \text{(Chemical Formula 7)}$$

$$(NH_4)_2CO_3 + MgO \rightarrow 2NH_4OH + CaCO_3 \quad \text{(Chemical Formula 8)}$$

Also, as described above, Chemical Formula which recycles an ammonia solution by reacting ammonium hydrogen carbonate and ammonium carbonate, which are products generated after carbon dioxide reacts with ammonia solution as a reaction solution, with magnesium oxide which is bivalent metal oxide is as in Chemical Formulas 9 and 10 below.

$$NH_4HCO_3 + MgO \rightarrow NH_4OH + MgCO_3 \quad \text{(Chemical Formula 9)}$$

$$(NH_4)_2CO_3 + MgO \rightarrow 2NH_4OH + MgCO_3 \quad \text{(Chemical Formula 9)}$$

In addition, as described above, Chemical Formula which recycles an ammonia solution by reacting ammonium hydrogen carbonate and ammonium carbonate, which are products generated after carbon dioxide reacts with ammonia solution as a reaction solution, with magnesium hydroxide which is bivalent metal hydroxide is as in Chemical Formulas 11 and 12 below.

$$NH_4HCO_3 + Mg(OH)_2 \rightarrow NH_4OH + MgCO_3 + 2H_2O \quad \text{(Chemical Formula 11)}$$

$$(NH_4)_2CO_3 + Mg(OH)_2 \rightarrow 2NH_4OH + MgCO_3 \quad \text{(Chemical Formula 12)}$$

A reaction solution reacted with carbon dioxide included in exhaust gas is transferred to the mixing tank 130 from the wet scrubber 110 through the transfer pump 123.

Bivalent metal oxide or bivalent metal hydroxide is supplied from the third storage tank 140 to the mixing tank 130 where the transferred reaction solution reacted with carbon dioxide included in exhaust gas is filled. Here, bivalent metal oxide or bivalent metal hydroxide may be supplied in an appropriate form such as powder, an aqueous solution, or sludge.

According to the first embodiment of the present invention, an amount of bivalent metal oxide or bivalent metal hydroxide supplied to the mixing tank 130 may be calculated by using Chemical Formula 5 through Chemical Formula 12. That is, bivalent metal oxide or bivalent metal hydroxide reacts with ammonium hydrogen carbonate and ammonium carbonate by the equivalence ratio of 1:1 and thereby, bivalent metal oxide or bivalent metal hydroxide may be supplied with the equivalence ratio that is same as an amount of treating ammonium hydrogen carbonate and ammonium carbonate.

When bivalent metal oxide or bivalent metal hydroxide is supplied to the mixing tank 130 as described above, bivalent metal oxide or bivalent metal hydroxide reacts with a reaction solution reacted with carbon dioxide included in exhaust gas as in Chemical Formula 5 through Chemical Formula 12.

As described above, when bivalent metal oxide or bivalent metal hydroxide reacts with a reaction solution reacted with carbon dioxide included in exhaust gas, carbonate such as calcium carbonate or magnesium carbonate and an ammonia solution are produced as indicated in Chemical Formula 5 through Chemical Formula 12.

Here, the reaction time needed to react a reaction solution reacted with carbon dioxide with bivalent metal oxide or bivalent metal hydroxide may be 30 to 120 minutes.

Carbonate such as calcium carbonate or magnesium carbonate produced by reacting a reaction solution reacted with carbon dioxide included in exhaust gas with bivalent metal oxide or bivalent metal hydroxide is mixed with an ammonia solution and is precipitated on the lower part of the mixing tank 130 in the forms of sludge. After the reaction time is passed, the sludge pump 131 included in the lower part of the mixing tank 130 is used to transfer sludge to the solid-liquid separator 150. Sludge transferred by the sludge pump 131 is separated into carbonate, which is a solid substance, and ammonia solution, which is liquid, in the solid-liquid separator 150.

Precipitate including the separated carbonate is transferred to the second storage tank 160 and the separated ammonia solution is transferred to the first storage tank 151.

The ammonia solution stored in the first storage tank 151 as above may be transferred to the circulation tank 120 by using the transfer pump 152 and then, may be produced as a reaction solution, if needed. Then, the reaction solution may be supplied to the wet scrubber 110, which treats exhaust gas, and may be reused as a reaction solution.

Also, the precipitate including carbonate stored in the second storage tank 160 may be solidified and stored according to a well-known method. When a vessel arrives at land, the solidified and stored precipitate is left a vessel and treated.

Here, as an ammonia solution may be included in precipitate while in separation of an ammonia solution and precipitate in the solid-liquid separator 150 or may be discharged along with exhaust gas to the upper end of the wet scrubber 110, a loss of an ammonia solution, which is a reaction solution, may occur to a certain degree.

As described above, when an ammonia solution is lost and is insufficient, the operating time of the apparatus 100 for purifying exhaust gas of a vessel may lengthen and absorption efficiency of carbon dioxide included in exhaust gas may be lowered.

In order to solve such problems, an ammonia solution, which may be insufficient to operate the apparatus 100 for purifying exhaust gas of a vessel, is supplied more by 1.0 to 2.0 times at the equivalence ratio of to-be-treated ammonium hydrogen carbonate and ammonium carbonate and thereby, an insufficient ammonia solution may be filled in the first embodiment of the present invention. As an ammonia solution is filled as above, the operating time of the apparatus 100 for purifying exhaust gas may be shortened and absorption efficiency of carbon dioxide may be raised.

Generally, ammonia gas used to produce an ammonia solution, which is a reaction solution reacted with exhaust gas, has bad smell and is toxic. Accordingly, when ammonia gas is handled in a vessel, there is a possibility of being exposed to crew. In particular, ammonia gas used to produce a reaction solution of exhaust gas in a vessel is highly toxic and safety of crew may not be secured if ammonia gas is leaked in a vessel.

In the present invention, in order to prevent crew from being exposed to ammonia gas, a tank used to store ammonia gas is not included in a vessel and a reaction solution reacted with exhaust gas reacts with bivalent metal oxide or bivalent metal hydroxide so as to be recycled as an ammonia solution.

Also, the ammonia solution recycled as above is supplied to the wet scrubber 110 and is reused and thus, a tank for storing ammonia gas is not needed in a vessel.

That is, according to the first embodiment of the present invention, an ammonia solution reacted with carbon dioxide included in exhaust gas is recycled and reused so that safety of entire crew and vessel may be improved.

In the mixing tank 130, a reaction solution reacted with carbon dioxide included in exhaust gas and bivalent metal oxide or bivalent metal hydroxide supplied from the third storage tank 140 are reacted with each other and thereby, a recycling reaction of the ammonia solution which may be reused as a reaction solution is accomplished.

An amount of bivalent metal oxide or bivalent metal hydroxide supplied from the third storage tank 140 to the mixing tank 130 may be estimated by analyzing pH or oxidation-reduction potential (ORP) of sludge including ammonium salt such as ammonium hydrogen carbonate ($NH_4HCO_3$) and ammonium carbonate ($NH_4)_2CO_3$ supplied to the mixing tank 130.

That is, as pH or ORP of sludge including ammonium salt such as ammonium hydrogen carbonate ($NH_4HCO_3$) and ammonium carbonate ($NH_4)_2CO_3$ is analyzed, acidity or ORP of sludge may be measured and thereby, a supplied amount of bivalent metal oxide or bivalent metal hydroxide may be estimated.

That is, according to the present invention, a supplied amount of bivalent metal oxide or bivalent metal hydroxide may increase by 1.0 to 2.0 times at the molar ratio to the estimated value.

When an amount of bivalent metal oxide or bivalent metal hydroxide is supplied below 1.0 time at the molar ratio, recycling efficiency of the ammonia solution is low. Also, when an amount of bivalent metal oxide or bivalent metal hydroxide is supplied over 2.0 times at the molar ratio, extra bivalent metal oxide or bivalent metal hydroxide is extracted and emitted.

Accordingly, safety issue on a vessel and crew may not occur while in storing, loading, and unloading.

Also, excessively supplied bivalent metal oxide or bivalent metal hydroxide increases concentration of an ammonia solution and thereby, absorption efficiency of carbon dioxide may increase.

In addition, according to the first embodiment of the present invention, in order not to install a tank for storing ammonia gas in a vessel, a method of dissolving ammonia gas may not be used and instead, an inorganic compound may react with calcium hydroxide to directly produce an ammonia solution.

That is, the inorganic compound used to directly produce an ammonia solution may include ammonium bicarbonate ($NH_4HCO_3$), ammonium carbonate (($NH_4)_2CO_3$), ammonium bisulfite ($NH_4HSO_4$), ammonium sulfate (($NH_4)_2SO_4$), ammonium nitrate ($NH_4NO_3$), ammonium chloride ($NH_4Cl$), ammonium sulfamate ($NH_4SO_3NH_2$), or ammonium sulfite (($NH_4)_2SO_3$).

The inorganic compound reacts with calcium hydroxide to produce an ammonia solution. The above produced ammonia solution is supplied to the wet scrubber 110 through the circulation tank 120 and thereby, a storage tank of ammonia gas used to produce an ammonia solution which is a reaction solution is not needed in a vessel.

According to the present invention, when an ammonia solution is produced by using an inorganic compound, the amount of the inorganic compound needs to be put by 1.0 to 2.0 times at the molar ratio of insufficient ammonia solution.

Also, according to the first embodiment of the present invention, a vessel including the apparatus 100 for purifying exhaust gas of a vessel described above may be provided.

As concentration of an ammonia solution, which is a reaction solution, is uniformly maintained by the apparatus 100 for purifying exhaust gas of a vessel as above, absorption performance of the wet scrubber 110 may be prevented from being lowered, regulations on discharge of exhaust gas by the IMO may be satisfied, and carbon dioxide may be changed into a substance that does not affect the environment so as to be separately discharged or stored.

Also, as an ammonia solution is recycled and reused, consumption of ammonia, which is relatively high-priced, may be minimized and thereby, a cost of purifying exhaust gas of a vessel may be significantly reduced.

Meanwhile, as carbon dioxide included in exhaust gas emitted from a vessel is solidified and stored in an appropriate reservoirs in a vessel, storage, resource recovery, and industrial utilization of collected carbon dioxide may be available.

A method of purifying exhaust gas of a vessel according to the first embodiment of the present invention described above may include i) reacting carbon dioxide included in exhaust gas emitted from a vessel with water to produce carbonic acid ($H_2CO_3$) in step 1;

ii) reacting carbonic acid produced in step 1 with an ammonia solution to produce ammonium hydrogen carbonate ($NH_4HCO_3$) in step 2;

iii) reacting ammonium hydrogen carbonate ($NH_4HCO_3$) produced in step 2 with an ammonia solution to produce ammonium carbonate (($NH_4)_2CO_3$) in step 3;

iv) reacting ammonium hydrogen carbonate ($NH_4HCO_3$) and ammonium carbonate ($NH_4)_2CO_3$ with bivalent metal oxide or bivalent metal hydroxide to produce carbonate and an ammonia solution in step 4; and v) re-supplying the ammonia solution produced in step 4 to step 2 in step 5.

Figure 5:
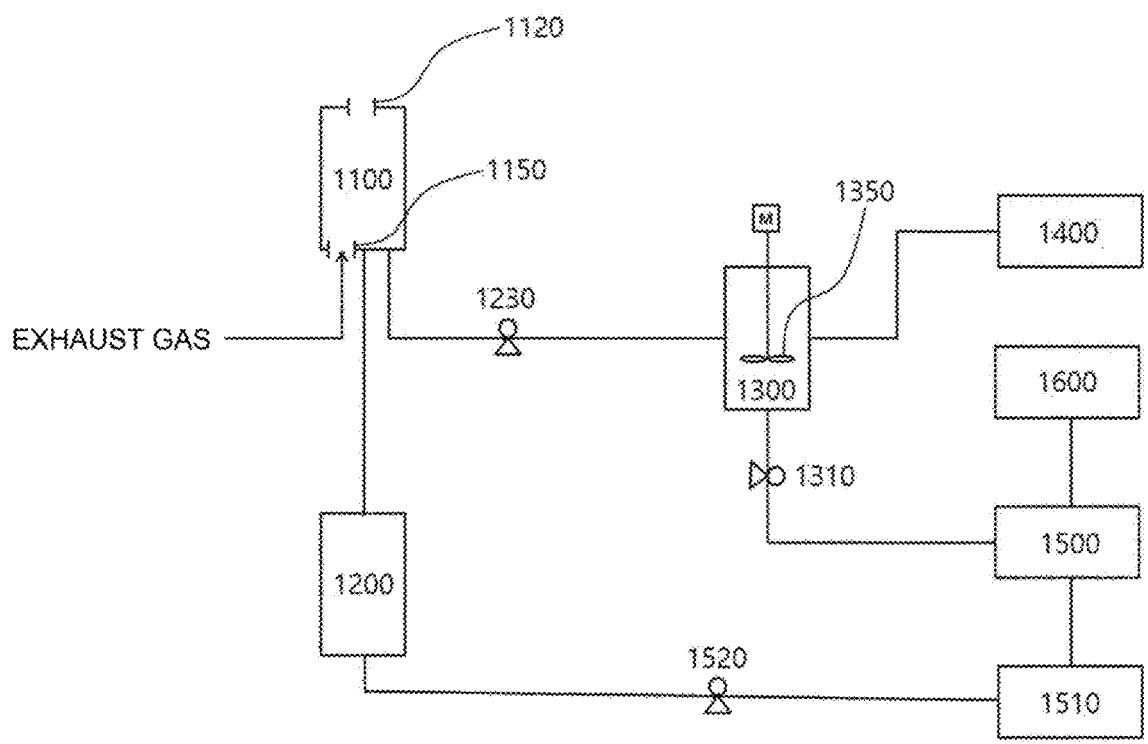
FIG. 5 is a block diagram schematically illustrating an apparatus for purifying exhaust gas of a vessel according to a second embodiment of the present invention.
Figure 6:
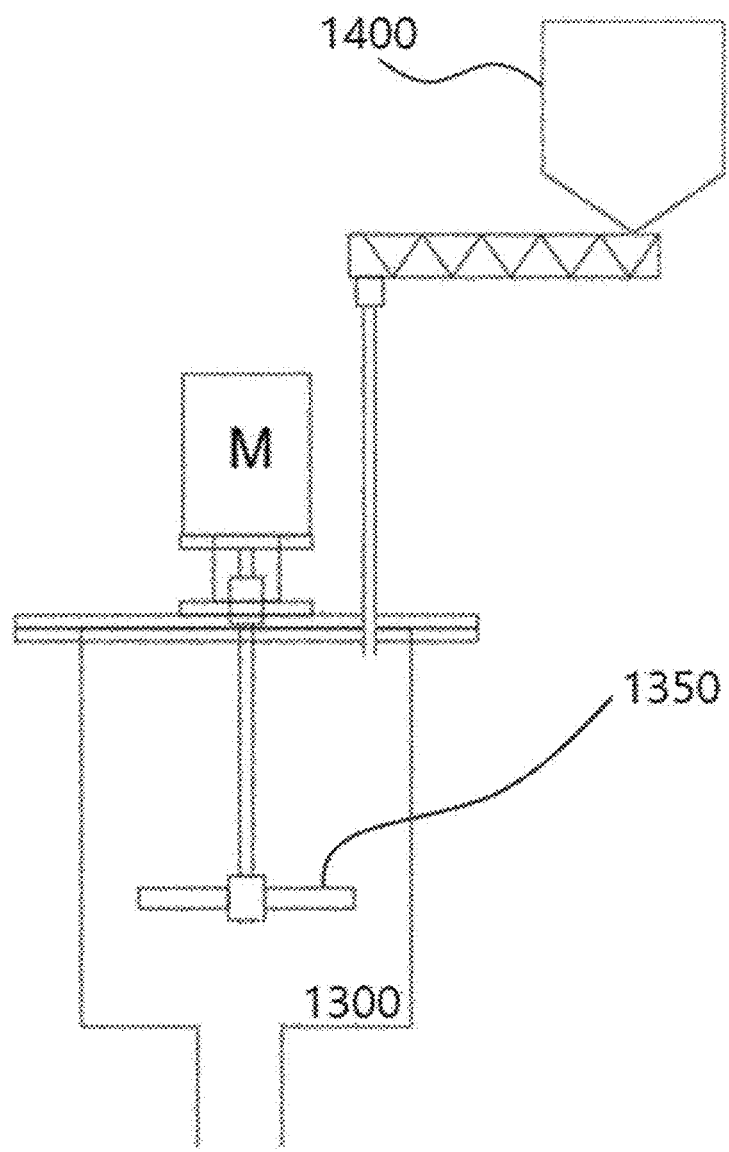
FIG. 6 is a block diagram of a thirteenth tank which stores and supplies bivalent metal oxide or bivalent metal hydroxide according to a second embodiment of the present invention.
Figure 7:
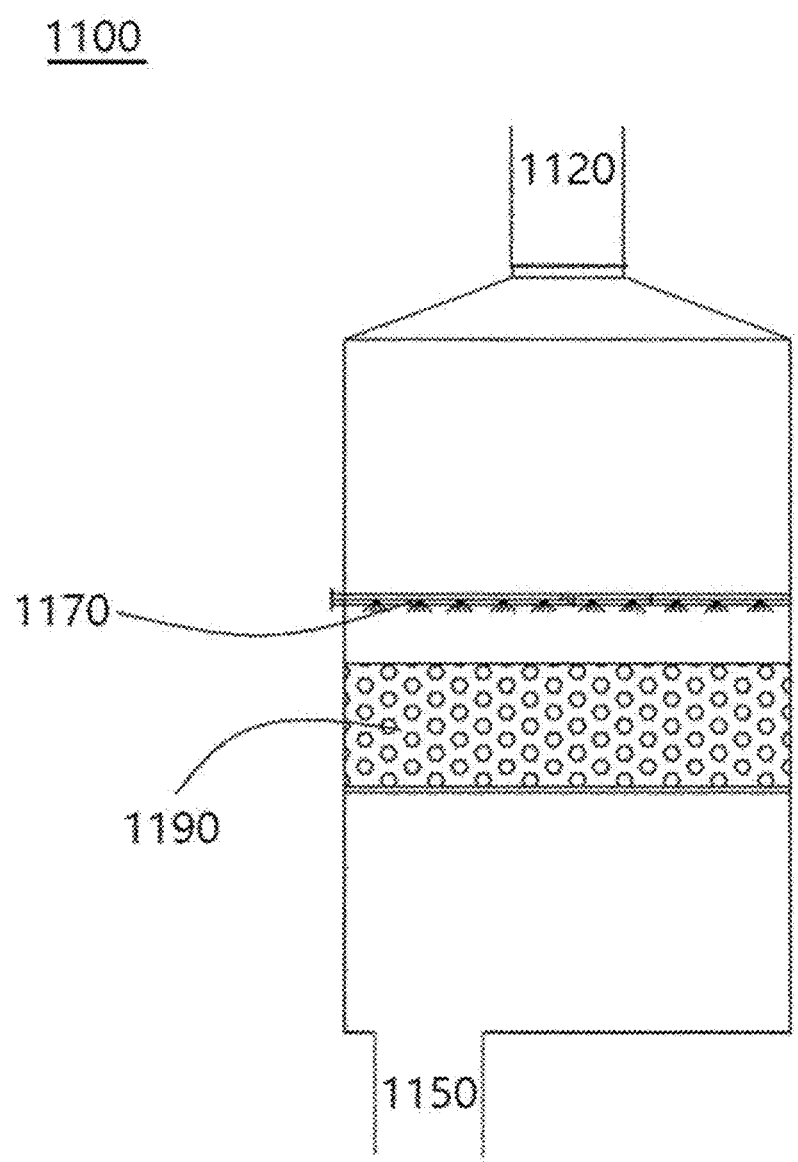
FIG. 7 is a block diagram of a wet scrubber according to a second embodiment of the present invention.
Figure 8:
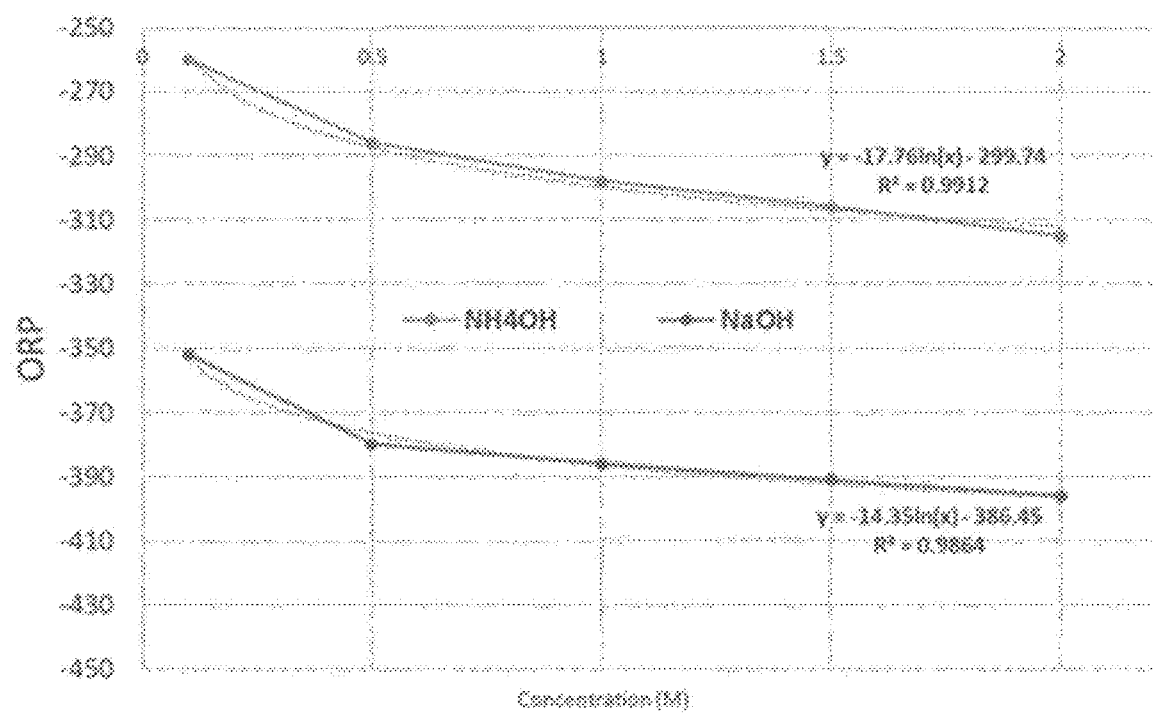
FIG. 8 is a graph which measures oxidation-reduction potential (ORP) in accordance with concentration of a reaction solution according to a second embodiment of the present invention.
Figure 9:
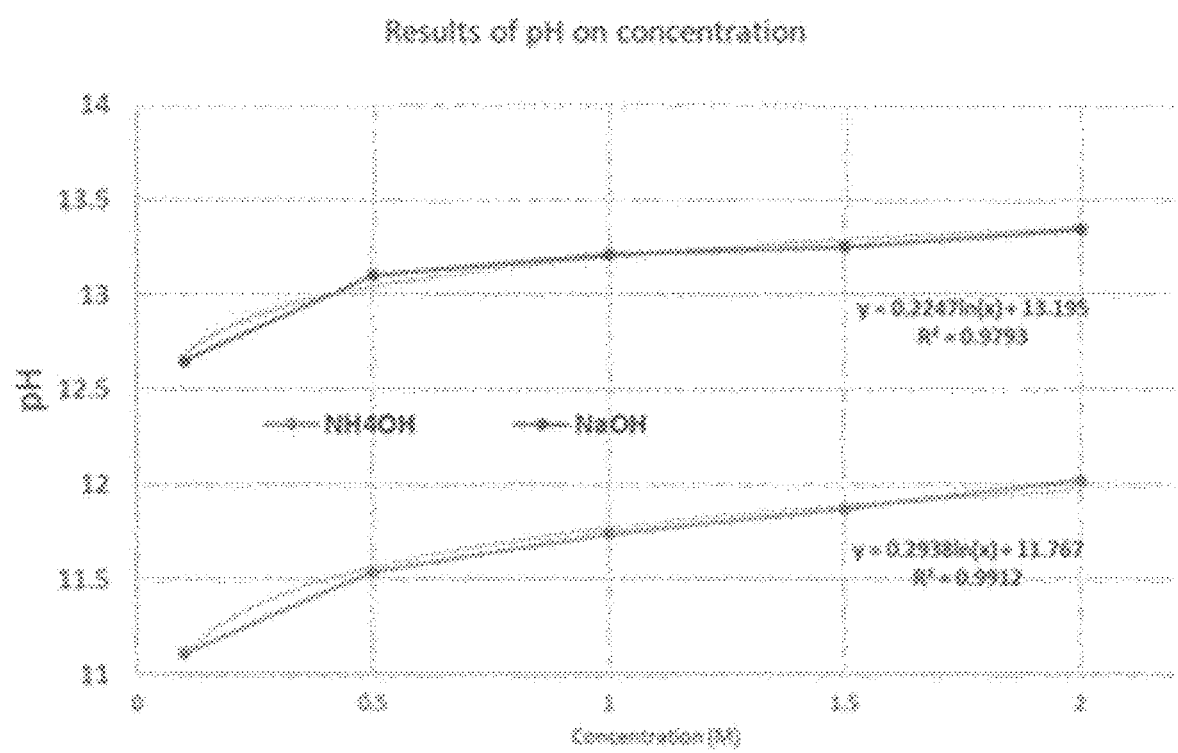
FIG. 9 is a graph which measures pH in accordance with concentration of a reaction solution according to a second embodiment of the present invention.
Figure 10:
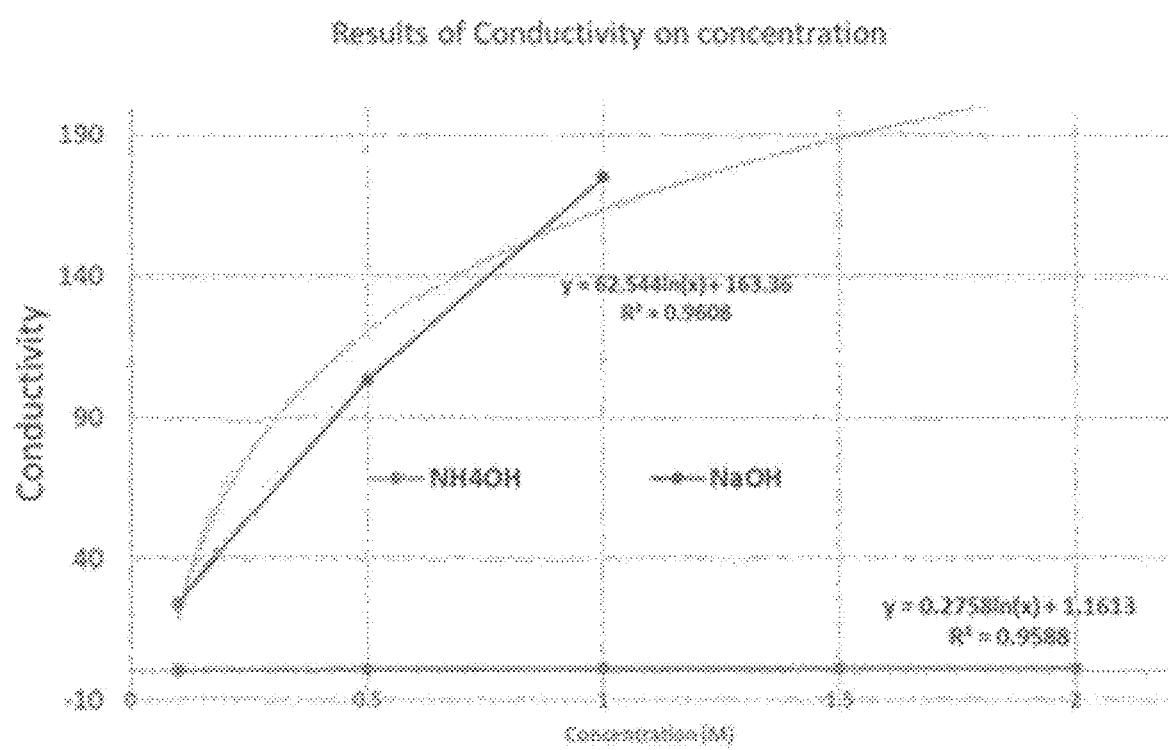
FIG. 10 is a graph which measures conductivity in accordance with concentration of a reaction solution according to a second embodiment of the present invention.

Also, method and apparatus for purifying exhaust gas of a vessel and a vessel including the same according to a second embodiment of the present invention will be described in more detail with reference to the accompanying drawings. FIG. 5 is a block diagram schematically illustrating an apparatus 1000 for purifying exhaust gas of a vessel according to a second embodiment of the present invention, FIG. 6 is a block diagram of a thirteenth tank 1400 which stores and supplies bivalent metal oxide or bivalent metal hydroxide according to a second embodiment of the present invention, FIG. 7 is a block diagram of a wet scrubber 1100 according to a second embodiment of the present invention, FIG. 8 is a graph which measures oxidation-reduction potential (ORP) in accordance with concentration of a reaction solution according to a second embodiment of the present invention, FIG. 9 is a graph which measures pH in accordance with concentration of a reaction solution according to a second embodiment of the present invention, and FIG. 10 is a graph which measures conductivity in accordance with concentration of a reaction solution according to a second embodiment of the present invention.

Referring to FIG. 5, the apparatus 1000 for purifying exhaust gas of a vessel according to the second embodiment of the present invention may include the wet scrubber 1100; an eleventh tank 1200; a transfer pump 1230; a twelfth tank 1300; the thirteenth tank 1400; a solid-liquid separator 1500; a sludge pump 1310; a fourteenth tank 1600; and fifteenth tank 1510, wherein the wet scrubber 1100 reacts exhaust gas generated from an exhaust gas generator with water and a reaction solution to change carbon dioxide and sulfur dioxide included in exhaust gas into mineral salt, the eleventh tank 1200 stores the reaction solution reacted with exhaust gas and supplies the reaction solution to the wet scrubber 1100, the transfer pump 1230 is included in the lower part of the wet scrubber 1100 and transfers a reaction solution including mineral salt to the twelfth tank 1300, the twelfth tank 1300 reacts mineral salt included in a reaction solution including mineral salt produced in the wet scrubber 1100 with bivalent metal oxide or bivalent metal hydroxide to recycle a reaction solution and produces sludge including carbonate and sulphate, the thirteenth tank 1400 stores and supplies bivalent metal oxide or bivalent metal hydroxide to the twelfth tank 1300, the solid-liquid separator 1500 separates carbonate and sulphate from the sludge transferred from the twelfth tank 1300, the sludge pump 1310 transfers carbonate and sulphate to the solid-liquid separator 1500 from the twelfth tank 1300, the fourteenth tank 1600 stores carbonate and sulphate separated from the solid-liquid separator 1500, and the fifteenth tank 1510 stores a recycle reaction solution separated from the solid-liquid separator 1500 and supplies the recycle reaction solution to the eleventh tank 1200.

The above described apparatus 1000 for purifying exhaust gas of a vessel according the second embodiment of the present invention may be equipped with a vessel. That is, the apparatus 1000 for purifying exhaust gas of a vessel may be equipped with one side of a hull of a vessel and the exhaust gas generator may be, for example, a main engine, a power generation engine, or a boiler. However, the exhaust gas generator is not particularly restricted and may be any well-known apparatus that is included in a vessel and emits exhaust gas.

More specifically, the apparatus 1000 for purifying exhaust gas of a vessel according to the second embodiment of the present invention firstly includes the wet scrubber 1100 which reacts exhaust gas with water and a reaction solution to change $CO_2$ and $SO_2$ included in exhaust gas into mineral salt.

As illustrated in FIG. 5, the inlet 1150 is included at one side of the wet scrubber 1100 and exhaust gas generated after fuel is combusted in the exhaust gas generator equipped with a vessel is flowed into the inlet 1150. Also, the wet scrubber 1100 includes the outlet 1120 at one side thereof so that flowed exhaust gas is processed and then, is discharged to the outside through the outlet 1120.

According to the second embodiment of the present invention, the wet scrubber 1100 reacts exhaust gas inflowed through the inlet 1150 with water and a reaction solution to produce mineral salt. Here, in the wet scrubber 1100, a process of spraying the reaction solution which absorbs gaseous contaminants included in exhaust gas is circulated and repeated and contaminants are precipitated or deposited on the lower part of the wet scrubber 1100 as in the form of sludge.

In the wet scrubber 1100, a reaction solution supply line 1170 is included to spray a reaction solution downward from the upper part of the inside of the wet scrubber 1100 as illustrated in FIG. 7. Here, the reaction solution supply line 1170 includes a plurality of spray nozzles (not illustrated) so as to spray the reaction solution downward.

Here, exhaust gas moves backwardly from the lower part to the upper part with respect to the reaction solution sprayed downward from the spray nozzles.

Also, the wet scrubber 1100 includes a filling member 1190 having a high surface area at the lower part of the reaction solution supply line 1170 as illustrated in FIG. 7. As the exhaust gas passes through the filling member 1190, contact efficiency with the reaction solution increases and thereby, removal efficiency of contaminants such as carbon dioxide and sulfur dioxide included in the exhaust gas may be increased.

In addition, according to the second embodiment of the present invention, eleventh tank 1200 stores and supplies the reaction solution to the wet scrubber 1100.

According to the second embodiment of the present invention, the reaction solution may be an ammonia aqueous solution, a sodium hydroxide aqueous solution, or a mixture thereof. Also, the reaction solution may further include a lithium hydroxide aqueous solution, a potassium hydroxide aqueous solution, a calcium hydroxide aqueous solution, or a magnesium hydroxide aqueous solution as an auxiliary reaction solution, in order to improve collection efficiency of $CO_2$ and $SO_2$.

Here, the concentration of the lithium hydroxide aqueous solution and the potassium hydroxide aqueous solution may be below 15 weight % compared with the total reaction solution and the concentration of the calcium hydroxide aqueous solution and the magnesium hydroxide aqueous solution may be below 2 weight % compared with the total reaction solution.

That is, prevention of a side reaction of the reaction solution in which the concentration of a lithium hydroxide aqueous solution and a potassium hydroxide aqueous solution exceeds 15 weight % compared with the total reaction solution or the concentration of a calcium hydroxide aqueous solution and a magnesium hydroxide aqueous solution may exceeds 2 weight % may be insignificant and enhancement effect for the saturated concentration of the reaction solution is low. Accordingly, effect of adding the auxiliary reaction solution is lowered.

The eleventh tank 1200 stores the reaction solution and supplied the reaction solution to the wet scrubber 1100, if needed.

Also, the wet scrubber 1100 includes the transfer pump 1230 at the lower part thereof to transfer mineral salt produced after being reacted with $CO_2$ and $SO_2$ included in exhaust gas to the twelfth tank 1300.

The twelfth tank 1300 reacts mineral salt included in the reaction solution transferred from the wet scrubber 1100 by the transfer pump 1230 with bivalent metal oxide or bivalent metal hydroxide to recycle a reaction solution.

In addition, according to the present invention, the thirteenth tank 1400 which stores and supplies bivalent metal oxide or bivalent metal hydroxide may be included to supply bivalent metal oxide or bivalent metal hydroxide to the twelfth tank 1300.

In the twelfth tank 1300, sludge including carbonate and sulphate produced by recycling a reaction solution is formed.

According to the second embodiment of the present invention, bivalent metal oxide which recycles a reaction solution by being reacted with mineral salt and forms sludge including carbonate and sulphate may be calcium oxide (CaO) or magnesium oxide (MgO) and bivalent metal hydroxide may be calcium hydroxide ($Ca(OH)_2$) or magnesium hydroxide ($Mg(OH)_2$).

According to the present invention, the twelfth tank 1300 may include an impeller 1350 operated by a motor as illustrated in FIG. 6 in order to easily mix the mineral salt with bivalent metal oxide or bivalent metal hydroxide.

According to the second embodiment of the present invention, mineral salt reacts with bivalent metal oxide or bivalent metal hydroxide, sludge including carbonate and sulphate is produced, and a reaction solution is recycled in the twelfth tank 1300.

Here, the reaction time needed to react a reaction solution reacted with mineral salt with bivalent metal oxide or bivalent metal hydroxide may be 30 to 120 minutes.

Carbonate and sulphate produced by reacting a reaction solution reacted with contaminants such as $CO_2$ and $SO_2$ included in exhaust gas with bivalent metal oxide or bivalent metal hydroxide is mixed with a recycled reaction solution and is precipitated on the lower part of the twelfth tank 1300 in the forms of sludge. After the reaction time is passed, the sludge pump 1310 included in the lower part of the twelfth tank 1300 is used to transfer sludge to the solid-liquid separator 1500.

Sludge transferred by the sludge pump 1310 is separated into carbonate and sulphate, which are solid substances, and a recycling reaction solution, which is liquid, in the solid-liquid separator 1500.

Carbonate and sulphate separated in the solid-liquid separator 1500 as above is transferred to the fourteenth tank 1600 and the separated reaction solution is transferred to the fifteenth tank 1510.

The recycling reaction solution recycled and stored in the fifteenth tank 1510 as above may be supplied to the wet scrubber 1100 which treats exhaust gas through the eleventh tank 1200 and may be reused as a reaction solution, if needed.

Also, the precipitate including carbonate and sulphate stored in the fourteenth tank 1600 may be solidified and stored according to a well-known method. When a vessel arrives at land, the solidified and stored precipitate is left a vessel and treated.

Here, as a reaction solution may be included in precipitate while in separation of a reaction solution, carbonate, and sulphate in the solid-liquid separator 1500 or may be discharged along with exhaust gas to the upper end of the wet scrubber 1100, a loss of a reaction solution may occur to a certain degree.

As described above, when a reaction solution is lost and is insufficient, the operating time of the apparatus 1000 for purifying exhaust gas of a vessel may lengthen and absorption efficiency of $CO_2$ and $SO_2$ included in exhaust gas may be lowered.

In order to solve such problems, a reaction solution, which may be insufficient to operate the apparatus 1000 for purifying exhaust gas of a vessel, is supplied more by 1.0 to 2.0 times at the equivalence ratio of to-be-treated carbonic acid, sulfuric acid, and sulfurous acid and thereby, an insufficient reaction solution may be filled in the second embodiment of the present invention.

In a sodium hydroxide aqueous solution and an ammonia aqueous solution which are reaction solution according to the second embodiment of the present invention, the concentration, ORP, pH, and conductivity approximately indicate linear correlation as in FIGS. 8 through 10.

That is, as illustrated in FIG. 8, linear correlation is shown in the concentration of the reaction solution and ORP measured values which are inverse proportional. In FIG. 9, linear correlation is shown in the concentration of the reaction solution and pH which are proportional. In FIG. 10, linear correlation is shown in the concentration of the reaction solution and conductivity which are proportional.

Accordingly, any one of ORP, pH, or conductivity of a reaction solution is measured to measure the concentration of a reaction solution and thus, the concentration of an insufficient reaction solution may be calculated. Accordingly, a reaction solution, which is insufficient, is supplied more by 1.0 to 2.0 times at the equivalence ratio of to-be-treated carbonic acid, sulfuric acid, and sulfurous acid so that an insufficient reaction solution may be filled.

As a reaction solution is filled as above, the operating time of the apparatus 1000 for purifying exhaust gas of a vessel according to the second embodiment of the present invention may be shortened and absorption efficiency of the contaminants may be raised.

The twelfth tank 1300 may include the sludge pump 1310 at one side thereof to transfer sludge including carbonate and sulphate produced in the twelfth tank 1300 to the solid-liquid separator 1500, after a reaction of $CO_2$ and $SO_2$ with a reaction solution is completed as above.

According to the second embodiment of the present invention, precipitate such as carbonate and sulphate is mixed with the recycled reaction solution in the sludge so that the reaction solution and the sludge need to be separated from each other to reuse the reaction solution afterward.

That is, as the sludge includes 20 to 50 weight % of the recycled reaction solution, various techniques or apparatuses for separating the recycled reaction solution from the sludge are suggested. Here, the solid-liquid separator 1500 may be a representative apparatus.

Such a solid-liquid separator 1500 may be in a filter press type or a belt press type. The filter press type or the belt press type solid-liquid separator 1500 is installed for a filter cloth belt to pass through a plurality of rollers so that sludge is inserted into the filter cloth belt, transferred, and is pressurized by the rollers. Accordingly, the reaction solution may be separated from the sludge.

According to the second embodiment of the present invention, the reaction solution transfer pump 1520 which transfers the reaction solution from the fifteenth tank 1510 to the eleventh tank 1200 may be further included to reuse the recycled reaction solution separated from the solid-liquid separator 1500, when $CO_2$ and $SO_2$ included in exhaust gas is absorbed.

In addition, the apparatus 1000 for purifying exhaust gas of a vessel according to the second embodiment of the present invention includes the thirteenth tank 1400 to supply bivalent metal oxide or bivalent metal hydroxide to the twelfth tank 1300. Here, bivalent metal oxide or bivalent metal hydroxide may be supplied in an appropriate form such as powder, an aqueous solution, or sludge.

The apparatus 1000 for purifying exhaust gas of a vessel according to the second embodiment of the present invention includes the fourteenth tank 1600 to store carbonate and sulphate separated from the solid-liquid separator 1500 and the separated recycled reaction solution is transferred to and stored in the fifteenth tank 1510.

The above described apparatus 1000 for purifying exhaust gas of a vessel according the second embodiment of the present invention may be equipped with a vessel. That is, the exhaust gas generator to generate exhaust gas may be included in the hull of a vessel and may be, for example, a main engine, a power generation engine, or a boiler. However, the exhaust gas generator is not particularly restricted and may be any well-known apparatus that emits exhaust gas.

In the exhaust gas generator, bunker C oil may be used as fuel. Bunker C oil which is vessel fuel has high calorific value and efficiency while in combustion and thereby, great amounts of energy may be generated. That is, compared with the calorific value of coal which is 5,000 to 7,000 kcal/kg, the calorific value of bunker C oil is 10,000 to 11,000 kcal/kg, which is about 2 times higher than that of coal.

Also, bunker C oil is cheaper than crude oil and thereby, is used a lot in a vessel or power plant.

In general, bunker C oil is composed of hydrocarbon compounds with carbon number of above 13, easily generates contaminants during combustion, and particularly includes a lot of environmental pollutants including sulfur.

According to the second embodiment of the present invention, a sodium hydroxide aqueous solution or an ammonia aqueous solution may be used to react with $CO_2$ and $SO_2$, which are contaminants included in exhaust gas emitted from a vessel, to produce and collect mineral salt. Also, a mixture of the solutions may be used.

Also, the reaction solution may be produced by using pure water or seawater. That is, sodium hydroxide (NaOH) or ammonia ($NH_3$) is dissolved in pure water or seawater to produce the reaction solution which absorbs $CO_2$ and $SO_2$.

According to the present invention, 0.1 to 20 weight % of sodium hydroxide may be included in a sodium hydroxide aqueous solution used as the reaction solution and 0.1 to 25 weight % of ammonia may be included in an ammonia aqueous solution. That is, a sodium hydroxide aqueous solution having the concentration of below 0.1 weight % has low absorption reaction velocity and saturated absorption amount and thereby, has low capability of collecting $CO_2$ and $SO_2$. Also, a sodium hydroxide aqueous solution having the concentration of above 20 weight % may corrode the apparatus 1000 for purifying exhaust gas of a vessel. In addition, an ammonia aqueous solution having the concentration of below 0.1 weight % has significantly low saturated absorption amount for $CO_2$ and $SO_2$ and an ammonia aqueous solution having the concentration of above 25 weight % has low solubility to water at an operating temperature of the apparatus 1000 for purifying exhaust gas of a vessel. Accordingly, dissolved ammonia may be changed into gas and emitted.

In particular, according to the second embodiment of the present invention, an auxiliary reaction solution such as a lithium hydroxide aqueous solution, a potassium hydroxide aqueous solution, a calcium hydroxide aqueous solution, or a magnesium hydroxide aqueous solution may be further included to improve collection efficiency of $CO_2$ and $SO_2$ included in exhaust gas emitted from a vessel. That is, the auxiliary reaction solution has lower absorption reaction velocity for $CO_2$ and $SO_2$ compared with that of a sodium hydroxide aqueous solution or an ammonia aqueous solution and thereby, prevents rapid absorption reaction for $CO_2$ and $SO_2$ of the reaction solution. Accordingly, a side reaction may be prevented. Also, although the reaction solution reaches the saturated concentration and absorption reaction for $CO_2$ and $SO_2$ is completed, the auxiliary reaction solution may continuously absorb $CO_2$ and $SO_2$ and thereby, the saturated concentration for $CO_2$ and $SO_2$ may be generally increased.

According to the second embodiment of the present invention, a method of purifying exhaust gas of a vessel to collect $CO_2$ and $SO_2$ included in exhaust gas emitted from a vessel by using a sodium hydroxide (NaOH) aqueous solution or an ammonia aqueous solution ($NH_4OH$), which is the reaction solution, includes i) reacting carbon dioxide included in exhaust gas emitted from a vessel with water to produce carbonic acid ($H_2CO_3$) in step a (operation S100); ii) reacting sulfur dioxide included in exhaust gas with water to produce sulfurous acid ($H_2SO_3$) and sulfuric acid ($H_2SO_4$) in step b (operation S200); iii) reacting carbonic acid ($H_2CO_3$) produced in step a (operation S100) with sulfurous acid ($H_2SO_3$), sulfuric acid ($H_2SO_4$) produced in step b (operation S200), and a reaction solution to produce a reaction solution including mineral salt in step c (operation S300); iv) reacting the reaction solution including mineral salt produced in step c (operation S300) with bivalent metal oxide or bivalent metal hydroxide to produce carbonate and sulphate and to recycle a reaction solution at the same time in step d (operation S500); and v) separating carbonate and sulphate included in the recycled reaction solution by using the solid-liquid separator 1500 in step e (operation S600).

Such steps are described in more detail as follows.

<Step a (S100)>

Step a to collect $CO_2$ and $SO_2$ included in exhaust gas emitted from a vessel according to the second embodiment of the present invention is to produce carbonic acid ($H_2CO_3$) by reacting $CO_2$ with water.

In step a, $CO_2$ included in exhaust gas reacts with water to produce carbonic acid ($H_2CO_3$) as in Chemical Formula 13 below. Here, water reacted with $CO_2$ may be included in a reaction solution that is sprayed to the wet scrubber 1100.

$$CO_2+H_2O \rightarrow H_2CO_3 \quad \text{(Chemical Formula 13)}$$

<Step b (S200)>

Step b is to produce sulfurous acid ($H_2SO_3$) and sulfuric acid ($H_2SO_4$) by reacting $SO_2$ included in exhaust gas of a vessel with water. That is, when $SO_2$ reacts with water while oxygen exists, a reaction occurs to produce sulfuric acid as in Chemical Formula 14. When oxygen does not exist, $SO_2$ reacts with water to produce sulfurous acid as in Chemical Formula 15.

Here, water reacted with $SO_2$ may be included in a reaction solution that is sprayed to the wet scrubber 1100 as in the same manner as in step a above.

$$2SO_2+O_2+2H_2O \rightarrow 2H_2SO_4 \quad \text{(Chemical Formula 14)}$$

$$SO_2+H_2O \rightarrow H_2SO_3 \quad \text{(Chemical Formula 15)}$$

<Step c (S300)>

Step C is to produce mineral salt by reacting carbonic acid ($H_2CO_3$) produced in step a (operation S100) with sulfurous acid ($H_2SO_3$), sulfuric acid ($H_2SO_4$) produced in step b (operation S200), and a reaction solution in the wet scrubber 1100.

A reaction of carbonic acid produced in step a with a sodium hydroxide aqueous solution or an ammonia aqueous solution is as below.

Carbonic acid produced as in Chemical Formula 13 then reacts with a sodium hydroxide aqueous solution to produce sodium bicarbonate ($NaHCO_3$) or sodium carbonate ($Na_2CO_3$), which is mineral salt, and water as in Chemical Formula 16 and Chemical Formula 17.

$$NaOH+H_2CO_3 \rightarrow NaHCO_3+H_2O \quad \text{(Chemical Formula 16)}$$

$$2NaOH+H_2CO_3 \rightarrow Na_2CO_3+2H_2O \quad \text{(Chemical Formula 17)}$$

Also, carbonic acid produced as in Chemical Formula 13 reacts with ammonia aqueous solution ($NH_4OH$) to produce ammonium hydrogen carbonate ($NH_4HCO_3$) or ammonium carbonate ($(NH_4)_2CO_3$), which is mineral salt, and water as in Chemical Formula 18 and Chemical Formula 19.

$$NH_4OH+H_2CO_3 \rightarrow NH_4HCO_3+H_2O \quad \text{(Chemical Formula 18)}$$

$$2NH_4OH+H_2CO_3 \rightarrow (NH_4)_2CO_3+2H_2O \quad \text{(Chemical Formula 18)}$$

In addition, sulfurous acid and sulfuric acid produced as in Chemical Formula 14 and Chemical Formula 15 reacts with sodium hydroxide (NaOH) aqueous solution, which is a reaction solution, as in Chemical Formula 20 through Chemical Formula 23 below.

Sulfurous acid produced by reacting $SO_2$ with water as in Chemical Formula 15 reacts with sodium hydroxide to produce sodium bisulfite ($NaHSO_3$), which is mineral salt, and water as in Chemical Formula 20 or reacts with sodium hydroxide to produce sodium sulfite ($Na_2SO_3$), which is mineral salt, and water as in Chemical Formula 21.

Moreover, sulfuric acid produced as in Chemical Formula 14 reacts with sodium hydroxide to produce sodium hydrogen sulfate ($NaHSO_4$), which is mineral salt, and water as in Chemical Formula 22 or reacts with sodium hydroxide to produce sodium sulfate ($Na_2SO_4$), which is mineral salt, and water as in Chemical Formula 23.

$$NaOH+H_2SO_3 \rightarrow NaHSO_3+H_2O \quad \text{(Chemical Formula 20)}$$

$$2NaOH+H_2SO_3 \rightarrow Na_2SO_3+2H_2O \quad \text{(Chemical Formula 21)}$$

$$NaOH+H_2SO_4 \rightarrow NaHSO_4+H_2O \quad \text{(Chemical Formula 22)}$$

$$2NaOH+H_2SO_4 \rightarrow Na_2SO_4+2H_2O \quad \text{(Chemical Formula 23)}$$

In a reaction of an ammonia aqueous solution with sulfurous acid or sulfuric acid as in step c, sulfurous acid or sulfuric acid reacts with an ammonia aqueous solution to produce ammonium hydrogen sulfite ($NH_4HSO_3$), ammonium sulfite (($NH_4)_2SO_3$), ammonium bisulfate ($NH_4HSO_4$), or ammonium sulfate ($(NH_4)_2SO_4$), which is mineral salt, and water as in Chemical Formula 24 through Chemical Formula 27.

$$NH_4OH+H_2CO_3 \rightarrow NH_4HCO_3+H_2O \quad \text{(Chemical Formula 24)}$$

$$2NH_4OH+H_2SO_3 \rightarrow (NH_4)_2SO_3+2H_2O \quad \text{(Chemical Formula 25)}$$

$$NH_4OH+H_2SO_4 \rightarrow NH_4HSO_4+H_2O \quad \text{(Chemical Formula 26)}$$

$$2NH_4OH+H_2SO_4 \rightarrow (NH_4)_2SO_4+2H_2O \quad \text{(Chemical Formula 27)}$$

<Step d (S400)>

Step d according to the second embodiment of the present invention is to produce sludge including carbonate and sulphate and to recycle a reaction solution at the same time by reacting a reaction solution including mineral salt produced in step c (operation S300) with bivalent metal oxide or bivalent metal hydroxide.

Here, according to the second embodiment of the present invention, bivalent metal oxide which reacts with mineral salt, recycle a reaction solution, and forms sludge may be calcium oxide (CaO) or magnesium oxide (MgO) and bivalent metal hydroxide may be calcium hydroxide ($Ca(OH)_2$) or magnesium hydroxide ($Mg(OH)_2$).

Here, bivalent metal oxide or bivalent metal hydroxide may be supplied in the form of powder, an aqueous solution, or sludge and may react with mineral salt.

According to the present invention, the twelfth tank 1300 may include the impeller 1350 operated by a motor as illustrated in FIG. 6 in order to easily mix the mineral salt produced as above with bivalent metal oxide or bivalent metal hydroxide.

In the twelfth tank 1300, sludge including carbonate and sulphate produced while recycling a reaction solution is formed.

A reaction of forming sludge including carbonate and sulphate produced while recycling a reaction solution in step d is as follows.

1. Reaction of Mineral Salt Produced by Reacting a Sodium Hydroxide Aqueous Solution with $CO_2$ with Calcium Oxide which is Bivalent Metal Oxide First, a method of recycling sodium hydroxide through a reaction of mineral salt produced by reacting a sodium hydroxide aqueous solution with $CO_2$ with calcium oxide which is bivalent metal oxide is as in Chemical Formula 28 through Chemical Formula 29 below.

That is, carbonic acid ($H_2CO_3$) produced by reacting $CO_2$ included in exhaust gas with water reacts with a sodium hydroxide aqueous solution to produce sodium bicarbonate ($NaHCO_3$) or sodium carbonate ($Na_2CO_3$), which is mineral salt, as in Chemical Formula 16 through Chemical Formula 17 above.

$$NaHCO_3+CaO \rightarrow NaOH+CaCO_3 \quad \text{(Chemical Formula 28)}$$

$$Na_2CO_3+CaO+H_2O \rightarrow 2NaOH+CaCO_3 \quad \text{(Chemical Formula 29)}$$

Sodium bicarbonate ($NaHCO_3$) or sodium carbonate ($Na_2CO_3$), which is mineral salt produced as above, reacts with calcium oxide to recycle sodium hydroxide and to produce $CaCO_3$ which is carbonate as in Chemical Formula 28 through Chemical Formula 29 above.

Also, a reaction in which $NH_4OH$ is recycled through a reaction of mineral salt produced by reacting an ammonia aqueous solution with $CO_2$ with calcium oxide which is bivalent metal oxide is as in Chemical Formula 30 through Chemical Formula 31 below.

That is, carbonic acid ($H_2CO_3$) produced by reacting $CO_2$ included in exhaust gas with water reacts with an ammonia aqueous solution to produce $NH_4HCO_3$ and $(NH_4)_2CO_3$, which are mineral salt, as in Chemical Formula 18 through Chemical Formula 19 above.

$$NH_4HCO_3+CaO \rightarrow NH_4OH+CaCO_3 \quad \text{(Chemical Formula 30)}$$

$$(NH_4)_2CO_3+CaO+H_2O \rightarrow 2NH_4OH+CaCO_3 \quad \text{(Chemical Formula 31)}$$

$NH_4HCO_3$ and $(NH_4)_2CO_3$, which are mineral salt produced as above, react with calcium oxide to recycle an ammonia aqueous solution and to produce $CaCO_3$ which is carbonate as in Chemical Formula 30 through Chemical Formula 31.

2. Reaction of Mineral Salt Produced by Reacting a Sodium Hydroxide Aqueous Solution with $SO_2$ with Calcium Oxide which is Bivalent Metal Oxide A reaction in which sodium hydroxide is recycled through a reaction of mineral salt produced by reacting a sodium hydroxide aqueous solution with $SO_2$ with calcium oxide which is bivalent metal oxide is as in Chemical Formula 32 through Chemical Formula 35 below.

That is, sulfuric acid and sulfurous acid produced by reacting $SO_2$ included in exhaust gas with water react with a sodium hydroxide aqueous solution to produce $NaHSO_3$, $Na_2SO_3$, $NaHSO_4$, or $Na_2SO_4$, which is mineral salt, as in Chemical Formula 20 through Chemical Formula 23 above.

$NaHSO_3$, $Na_2SO_3$, $NaHSO_4$, or $Na_2SO_4$, which is mineral salt produced as above, reacts with calcium oxide to recycle sodium hydroxide and to produce $CaSO_3$ or $CaSO_4$ which is sulphate as in Chemical Formula 32 through Chemical Formula 35 below.

$$NaHSO_3 + CaO \rightarrow NaOH + CaSO_3 \quad \text{(Chemical Formula 32)}$$

$$Na_2SO_3 + CaO + H_2O \rightarrow 2NaOH + CaSO_3 \quad \text{(Chemical Formula 33)}$$

$$NaHSO_4 + CaO \rightarrow NaOH + CaSO_4 \quad \text{(Chemical Formula 34)}$$

$$Na_2SO_4 + CaO + H_2O \rightarrow 2NaOH + CaSO_4 \quad \text{(Chemical Formula 35)}$$

A method of recycling the ammonia aqueous solution through a reaction of mineral salt produced by reacting an ammonia aqueous solution, which is a reaction solution, with $SO_2$ with calcium oxide which is bivalent metal oxide is as in Chemical Formula 36 through Chemical Formula 39 below.

That is, sulfuric acid and sulfurous acid produced by reacting $SO_2$ included in exhaust gas with water react with an ammonia aqueous solution to produce $NH_4HSO_3$, $(NH_4)_2SO_3$, $NH_4HSO_4$, or $(NH_4)_2SO_4$, which is mineral salt, as in Chemical Formula 24 through Chemical Formula 27 above.

$$NH_4HSO_3 + CaO \rightarrow NH_4OH + CaSO_3 \quad \text{(Chemical Formula 36)}$$

$$(NH_4)_2SO_3 + CaO + H_2O \rightarrow 2NH_4OH + CaSO_3 \quad \text{(Chemical Formula 37)}$$

$$NH_4HSO_4 + CaO \rightarrow NH_4OH + CaSO_4 \quad \text{(Chemical Formula 38)}$$

$$(NH_4)_2SO_4 + CaO + H_2O \rightarrow 2NH_4OH + CaSO_4 \quad \text{(Chemical Formula 39)}$$

$NH_4HSO_3$, $(NH_4)_2SO_3$, $NH_4HSO_4$, or $(NH_4)_2SO_4$, which is mineral salt produced as above, reacts with calcium oxide to recycle an ammonia aqueous solution and to produce $CaSO_3$ or $CaSO_4$ which is sulphate as in Chemical Formula 36 through Chemical Formula 39 above.

3. Reaction of Mineral Salt Produced by Reacting a Sodium Hydroxide Aqueous Solution with $CO_2$ with Magnesium Oxide which is Bivalent Metal Oxide According to the second embodiment of the present invention, a reaction in which sodium hydroxide is recycled through a reaction of mineral salt produced by reacting a sodium hydroxide aqueous solution with $CO_2$ with magnesium oxide which is bivalent metal oxide is as in Chemical Formula 40 through Chemical Formula 41 below.

That is, carbonic acid ($H_2CO_3$) produced by reacting $CO_2$ included in exhaust gas with water react with a sodium hydroxide aqueous solution to produce sodium bicarbonate ($NaHCO_3$) and sodium carbonate ($Na_2CO_3$), which are mineral salt, as in Chemical Formula 16 through Chemical Formula 17 above.

$$NaHCO_3 + MgO \rightarrow NaOH + MgCO_3 \quad \text{(Chemical Formula 40)}$$

$$Na_2CO_3 + MgO + H_2O \rightarrow 2NaOH + MgCO_3 \quad \text{(Chemical Formula 41)}$$

Sodium bicarbonate ($NaHCO_3$) and sodium carbonate ($Na_2CO_3$), which are mineral salt produced as above, react with magnesium oxide to recycle sodium hydroxide and to produce $MgCO_3$ which is carbonate as in Chemical Formula 40 through Chemical Formula 41 above. Here, water may be needed as in Chemical Formula 41.

Also, a reaction in which an ammonia aqueous solution is recycled through a reaction of mineral salt produced by reacting an ammonia aqueous solution with $CO_2$ with magnesium oxide which is bivalent metal oxide is as in Chemical Formula 42 through Chemical Formula 43 below.

That is, carbonic acid ($H_2CO_3$) produced by reacting $CO_2$ included in exhaust gas with water reacts with an ammonia aqueous solution to produce $NH_4HCO_3$ and $(NH_4)_2CO_3$, which are mineral salt, as in Chemical Formula 18 through Chemical Formula 19 above.

$$NH_4HCO_3 + MgO \rightarrow NH_4OH + MgCO_3 \quad \text{(Chemical Formula 42)}$$

$$(NH_4)_2CO_3 + MgO + H_2O \rightarrow 2NH_4OH + MgCO_3 \quad \text{(Chemical Formula 42)}$$

$NH_4HCO_3$ and $(NH_4)_2CO_3$, which are mineral salt, react with magnesium oxide to recycle an ammonia aqueous solution and to produce $MgCO_3$ which is carbonate as in Chemical Formula 42 through Chemical Formula 43. Here, water may be needed as in Chemical Formula 43.

4. Reaction of Mineral Salt Produced by Reacting a Sodium Hydroxide Aqueous Solution with $SO_2$ with Magnesium Oxide which is Bivalent Metal Oxide A method of recycling NaOH through a reaction of mineral salt produced by reacting a sodium hydroxide aqueous solution, which is a reaction solution, with $SO_2$ with magnesium oxide which is bivalent metal oxide is as in Chemical Formula 44 through Chemical Formula 47 below.

That is, sulfuric acid and sulfurous acid produced by reacting $SO_2$ included in exhaust gas with water react with a sodium hydroxide aqueous solution to produce $NaHSO_3$, $Na_2SO_3$, $NaHSO_4$, and $Na_2SO_4$, which are mineral salt, as in Chemical Formula 20 through Chemical Formula 23 above.

$$NaHSO_3 + MgO \rightarrow NaOH + MgSO_3 \quad \text{(Chemical Formula 44)}$$

$$Na_2SO_3 + MgO + H_2O \rightarrow 2NaOH + MgSO_3 \quad \text{(Chemical Formula 45)}$$

$$NaHSO_4 + MgO \rightarrow NaOH + MgSO_4 \quad \text{(Chemical Formula 46)}$$

$$Na_2SO_4 + MgO + H_2O \rightarrow 2NaOH + MgSO_4 \quad \text{(Chemical Formula 47)}$$

$NaHSO_3$, $Na_2SO_3$, $NaHSO_4$, and $Na_2SO_4$, which are mineral salt produced as above, react with magnesium oxide to recycle sodium hydroxide and to produce $MgSO_3$ or $MgSO_4$ which is sulphate as in Chemical Formula 44 through Chemical Formula 47 above.

Also, a method of recycling the ammonia aqueous solution through a reaction of mineral salt produced by reacting an ammonia aqueous solution with $SO_2$ with magnesium oxide which is bivalent metal oxide is as in Chemical Formula 48 through Chemical Formula 51 below.

That is, sulfuric acid and sulfurous acid produced by reacting $SO_2$ included in exhaust gas with water react with an ammonia aqueous solution to produce $NH_4HSO_3$, $(NH_4)_2SO_3$, $NH_4HSO_4$, or $(NH_4)_2SO_4$, which is mineral salt, as in Chemical Formula 24 through Chemical Formula 27 above.

$$NH_4HSO_3 + MgO \rightarrow NH_4OH + MgSO3 \quad \text{(Chemical Formula 48)}$$

$$(NH_4)_2SO_3 + MgO + H_2O \rightarrow 2NH_4OH + MgSO_3 \quad \text{(Chemical Formula 49)}$$

$$NH_4HSO_4 + MgO \rightarrow NH_4OH + MgSO_4 \quad \text{(Chemical Formula 50)}$$

$$(NH_4)_2SO_4 + MgO + H_2O \rightarrow 2NH_4OH + MgSO_4 \quad \text{(Chemical Formula 51)}$$

$NH_4HSO_3$, $(NH_4)_2SO_3$, $NH_4HSO_4$, or $(NH_4)_2SO_4$, which is mineral salt produced as above, react with magnesium oxide to the recycle ammonia aqueous solution and to produce $MgSO_3$ or $MgSO_4$ which is sulphate as in Chemical Formula 48 through Chemical Formula 51 above. Here, water may be needed as in Chemical Formula 49 and Chemical Formula 51.

5. Reaction of Mineral Salt Produced by Reacting a Sodium Hydroxide Aqueous Solution with $SO_2$ with Calcium Hydroxide which is Bivalent Metal Hydroxide A reaction in which sodium hydroxide is recycled through a reaction of mineral salt produced by reacting a sodium hydroxide aqueous solution with $SO_2$ with calcium hydroxide which is bivalent metal hydroxide is as in Chemical Formula 52 through Chemical Formula 55 below.

That is, sulfuric acid and sulfurous acid produced by reacting $SO_2$ included in exhaust gas with water react with a sodium hydroxide aqueous solution to produce $NaHSO_3$, $Na_2SO_3$, $NaHSO_4$, or $Na_2SO_4$, which is mineral salt, as in Chemical Formula 20 through Chemical Formula 23 above.

$$NaHSO_3 + Ca(OH)_2 \rightarrow NaOH + CaSO_3 + H_2O \quad \text{(Chemical Formula 52)}$$

$$Na_2SO_3 + Ca(OH)_2 \rightarrow 2NaOH + CaSO_3 \quad \text{(Chemical Formula 53)}$$

$$NaHSO_4 + Ca(OH)_2 \rightarrow NaOH + CaSO_4 + H_2O \quad \text{(Chemical Formula 54)}$$

$$Na_2SO_4 + Ca(OH)_2 \rightarrow 2NaOH + CaSO_4 \quad \text{(Chemical Formula 55)}$$

$NaHSO_3$, $Na_2SO_3$, $NaHSO_4$, or $Na_2SO_4$, which is mineral salt produced as above, react with calcium hydroxide to recycle sodium hydroxide and to produce $CaSO_3$ or $CaSO_4$, which is sulphate, and water as in Chemical Formula 52 through Chemical Formula 55 above.

Also, a method of recycling $NH_4OH$ through a reaction of mineral salt produced by reacting an ammonia aqueous solution with $SO_2$ with calcium hydroxide which is bivalent metal hydroxide is as in Chemical Formula 56 through Chemical Formula 59 above.

That is, sulfuric acid and sulfurous acid produced by reacting $SO_2$ included in exhaust gas with water react with an ammonia aqueous solution to produce $NH_4HSO_3$, $(NH_4)_2SO_3$, $(NH_4)_2SO_4$, or $NH_4HSO_4$, which is mineral salt, as in Chemical Formula 24 through Chemical Formula 27 above.

$$NH_4HSO_3 + Ca(OH)_2 \rightarrow NH_4OH + CaSO_3 + H_2O \quad \text{(Chemical Formula 56)}$$

$$(NH_4)_2SO_3 + Ca(OH)_2 \rightarrow 2NH_4OH + CaSO_3 \quad \text{(Chemical Formula 57)}$$

$$NH_4HSO_4 + Ca(OH)_2 \rightarrow NH_4OH + CaSO_4 + H_2O \quad \text{(Chemical Formula 58)}$$

$$(NH_4)_2SO_4 + Ca(OH)_2 \rightarrow 2NH_4OH + CaSO_4 \quad \text{(Chemical Formula 59)}$$

$NH_4HSO_3$, $(NH_4)_2SO_3$, $(NH_4)_2SO_4$, or $NH_4HSO_4$, which is mineral salt produced as above, reacts with calcium hydroxide to recycle the ammonia aqueous solution and to produce $CaSO_3$ or $CaSO_4$, which is sulphate, and water as in Chemical Formula 56 through Chemical Formula 59 above.

6. Reaction of Mineral Salt Produced by Reacting a Sodium Hydroxide Aqueous Solution with $CO_2$ with Calcium Hydroxide which is Bivalent Metal Hydroxide A reaction in which sodium hydroxide is recycled through a reaction of mineral salt produced by reacting a sodium hydroxide aqueous solution with $CO_2$ with calcium hydroxide which is bivalent metal hydroxide is as in Chemical Formula 60 through Chemical Formula 61 below.

That is, carbonic acid ($H_2CO_3$) produced by reacting $CO_2$ included in exhaust gas with water reacts with a sodium hydroxide aqueous solution to produce sodium bicarbonate ($NaHCO_3$) or sodium carbonate ($Na_2CO_3$), which is mineral salt, as in Chemical Formula 16 through Chemical Formula 17 above.

$$NaHCO_3 + Ca(OH)_2 \rightarrow NaOH + CaCO_3 + H_2O \quad \text{(Chemical Formula 60)}$$

$$Na_2CO_3 + Ca(OH)_2 \rightarrow 2NaOH + CaCO_3 \quad \text{(Chemical Formula 61)}$$

sodium bicarbonate ($NaHCO_3$) or sodium carbonate ($Na_2CO_3$), which is mineral salt produced as above, reacts with calcium hydroxide to recycle sodium hydroxide and to produce $CaCO_3$, which is carbonate, and water as in Chemical Formula 60 through Chemical Formula 61 above.

Also, a method of recycling the ammonia aqueous solution through a reaction of mineral salt produced by reacting an ammonia aqueous solution, which is a reaction solution, with $CO_2$ with calcium hydroxide which is bivalent metal hydroxide is as in Chemical Formula 62 through Chemical Formula 63 below.

That is, carbonic acid ($H_2CO_3$) produced by reacting $CO_2$ included in exhaust gas with water reacts with an ammonia aqueous solution to produce $NH_4HCO_3$ or $(NH_4)_2CO_3$, which is mineral salt, as in Chemical Formula 18 through Chemical Formula 19 above.

$$NH_4HCO_3 + Ca(OH)_2 \rightarrow NH_4OH + CaCO_3 + H_2O \quad \text{(Chemical Formula 62)}$$

$$(NH_4)_2CO_3 + Ca(OH)_2 \rightarrow 2NH_4OH + CaCO_3 \quad \text{(Chemical Formula 63)}$$

$NH_4HCO_3$ or $(NH_4)_2CO_3$, which is mineral salt produced as above, reacts with calcium hydroxide to recycle the ammonia aqueous solution and to produce $CaCO_3$, which is carbonate, and water as in Chemical Formula 62 through Chemical Formula 63 above.

7. Reaction of Mineral Salt Produced by Reacting a Sodium Hydroxide Aqueous Solution with $SO_2$ with Magnesium Hydroxide which is Bivalent Metal Hydroxide A reaction in which sodium hydroxide is recycled through a reaction of mineral salt produced by reacting a sodium hydroxide aqueous solution, which is a reaction solution, with sulfuric acid and sulfurous acid with magnesium hydroxide which is bivalent metal hydroxide is as in Chemical Formula 64 through Chemical Formula 67 below.

That is, sulfuric acid and sulfurous acid produced by reacting $SO_2$ included in exhaust gas with water react with a sodium hydroxide aqueous solution to produce $NaHSO_3$, $Na_2SO_3$, $NaHSO_4$, or $Na_2SO_4$, which is mineral salt, as in Chemical Formula 20 through Chemical Formula 23 above.

$$NaHSO_3 + Mg(OH)_2 \rightarrow NaOH + MgSO_3 + H_2O \quad \text{(Chemical Formula 64)}$$

$$Na_2SO_3 + Mg(OH)_2 \rightarrow 2NaOH + MgSO_3 \quad \text{(Chemical Formula 65)}$$

$$NaHSO_4 + Mg(OH)_2 \rightarrow NaOH + MgSO_4 + H_2O \quad \text{(Chemical Formula 66)}$$

$$Na_2SO_4 + Mg(OH)_2 \rightarrow 2NaOH + MgSO_4 \quad \text{(Chemical Formula 67)}$$

$NaHSO_3$, $Na_2SO_3$, $NaHSO_4$, or $Na_2SO_4$, which is mineral salt produced as above, reacts with magnesium hydroxide to recycle sodium hydroxide and to produce $MgSO_3$ or $MgSO_4$, which is sulphate, and water as in Chemical Formula 64 through Chemical Formula 67 above.

Also, a method of recycling $NH_4OH$ through a reaction of mineral salt produced by reacting an ammonia aqueous solution, which is a reaction solution, with $SO_2$ with calcium hydroxide which is bivalent metal hydroxide is as in Chemical Formula 68 through Chemical Formula 71 below.

That is, sulfuric acid and sulfurous acid produced by reacting $SO_2$ included in exhaust gas with water react with an ammonia aqueous solution to produce $NH_4HSO_3$, $(NH_4)_2SO_3$, $(NH_4)_2SO_4$, or $NH_4HSO_4$, which is mineral salt, as in Chemical Formula 24 through Chemical Formula 27 above.

$$NH_4HSO_3 + Mg(OH)_2 \rightarrow NH_4OH + MgSO_3 + H_2O \quad \text{(Chemical Formula 68)}$$

$$(NH_4)_2SO_3 + Mg(OH)_2 \rightarrow 2NH_4OH + MgSO_3 \quad \text{(Chemical Formula 69)}$$

$$NH_4HSO_4 + Mg(OH)_2 \rightarrow 2NH_4OH + MgSO_4 + H_2O \quad \text{(Chemical Formula 70)}$$

$$(NH_4)_2SO_4 + Mg(OH)_2 \rightarrow 2NH_4OH + MgSO_4 \quad \text{(Chemical Formula 71)}$$

$NH_4HSO_3$, $(NH_4)_2SO_3$, $(NH_4)_2SO_4$, or $NH_4HSO_4$, which is mineral salt produced as above, reacts with magnesium hydroxide to recycle the ammonia aqueous solution and to produce $MgSO_3$ or $MgSO_4$, which is sulphate, and water as in Chemical Formula 68 through Chemical Formula 71 above.

8. Reaction of Mineral Salt Produced by Reacting a Sodium Hydroxide Aqueous Solution with $CO_2$ with Magnesium Hydroxide which is Bivalent Metal Hydroxide According to the second embodiment of the present invention, a reaction in which NaOH is recycled through a reaction of mineral salt produced by reacting a sodium hydroxide aqueous solution, which is a reaction solution, with $CO_2$ with magnesium hydroxide which is bivalent metal hydroxide is as in Chemical Formula 72 through Chemical Formula 73 below.

That is, carbonic acid ($H_2CO_3$) produced by reacting $CO_2$ included in exhaust gas with water reacts with a sodium hydroxide aqueous solution to produce sodium bicarbonate ($NaHCO_3$) or sodium carbonate ($Na_2CO_3$), which is mineral salt, as in Chemical Formula 16 through Chemical Formula 17 above.

$NaHCO_3+Mg(OH)_2 \rightarrow NaOH+MgCO_3+H_2O$ (Chemical Formula 72)

$Na_2CO_3+Mg(OH)_2 \rightarrow 2NaOH+MgCO_3$ (Chemical Formula 73)

$NaHCO_3$ or $Na_2CO_3$, which is mineral salt produced as above, reacts with magnesium hydroxide to recycle sodium hydroxide and to produce $MgCO_3$, which is carbonate, and water as in Chemical Formula 72 through Chemical Formula 73 above.

In addition, a reaction in which an ammonia aqueous solution is recycled through a reaction of mineral salt produced by reacting an ammonia aqueous solution, which is a reaction solution, with $CO_2$ with magnesium hydroxide which is bivalent metal hydroxide is as in Chemical Formula 74 through Chemical Formula 75 below.

That is, carbonic acid ($H_2CO_3$) produced by reacting $CO_2$ included in exhaust gas with water reacts with an ammonia aqueous solution to produce $NH_4HCO_3$ or $(NH_4)_2CO_3$, which is mineral salt, as in Chemical Formula 18 through Chemical Formula 19 above.

$NH_4HCO_3+Mg(OH)_2 \rightarrow NH_4OH+MgCO_3+H_2O$ (Chemical Formula 74)

$(NH_4)_2CO_3+Mg(OH)_2 \rightarrow 2NH_4OH+MgCO_3$ (Chemical Formula 75)

$NH_4HCO_3$ or $(NH_4)_2CO_3$, which is mineral salt produced as above, reacts with magnesium hydroxide to recycle an ammonia aqueous solution and to produce $MgCO_3$, which is carbonate, and water as in Chemical Formula 74 through Chemical Formula 75 above.

As described above, bivalent metal oxide or bivalent metal hydroxide may be used to produce carbonate and sulphate and to recycle a sodium hydroxide aqueous solution or an ammonia aqueous solution.

<Step e (S500)>

Carbonate and sulphate produced through step d as described above are mixed with a recycled reaction solution so as to be existed in the form of sludge. In order to reuse a recycled reaction solution in which carbonate and sulphate are mixed therewith, carbonate and sulphate may be separated through step e. Here, separation of carbonate and sulphate may be executed by using the solid-liquid separator 1500.

Carbonate existing in a recycled reaction solution as above may be $CaCO_3$, $CaCO_4$, $MgCO_3$, and $MgCO_4$ and sulphate existing in a recycled reaction solution as above may be $CaSO_3$, $CaSO_4$, $MgSO_3$, and $MgSO_4$.

Carbonate and sulphate described above may be easily crystallized in a sodium hydroxide aqueous solution or an ammonia aqueous solution, which is a reaction solution. In this regard, carbonate and sulphate which are crystallized into a solid state may be easily separated through the solid-liquid separator 1500.

Mineral salt produced by reacting $CO_2$ and $SO_2$ with a reaction solution reacts with bivalent metal oxide or bivalent metal hydroxide to recycle the reaction solution and to produce carbonate and sulphate. As such carbonate and sulphate are harmless substances, carbonate and sulphate may be solidified and stored in a vessel and may be easily treated when a vessel arrives at land.

According to the apparatus 1000 for purifying exhaust gas of a vessel in the second embodiment of the present invention, contaminants included in exhaust gas emitted from a vessel are collected and solidified and thereby, may be easily stored and transferred to land. Also, self-recycling and self-reuse of a reaction solution used in the wet scrubber 1100 to absorb contaminants are available in a vessel so that consumption of the reaction solution may be reduced and thereby, a cost of purifying exhaust gas of a vessel may be significantly reduced. In this regard, contaminants included in exhaust gas emitted from a vessel are absorbed so that regulations on discharge of exhaust gas by the IMO may be satisfied and release of substances which may affect the marine environmental pollution may be minimized.

Although representative embodiments of the present invention have been described in detail with reference to the accompanying experimental examples illustrated in the drawings, those of ordinary skill in the art to which the present invention pertains will understand that various modifications and other equivalent experimental examples are capable of being made to the above-described embodiments. Also, it will be understood by those of ordinary skill in the art that various changes in form and details may be made therein without departing from the spirit and scope of the present invention. Therefore, embodiments described above are only exemplary embodiments and should not be limited thereto. The scope of the present invention should be defined by technical ideas of the following claims.

The invention claimed is:

1. An apparatus (100) for purifying exhaust gas of a vessel comprising:
   a wet scrubber (110) which reacts exhaust gas generated from an exhaust gas generator included in a vessel with a reaction solution to convert carbon dioxide included in exhaust gas into ammonium salt;
   an inlet (115) which makes inflow of exhaust gas into the inside of the wet scrubber (110) and an outlet (112) which discharges exhaust gas to the outside of the wet scrubber (110);
   a circulation tank (120) which produces a reaction solution reacted with exhaust gas and supplies the produced reaction solution to the wet scrubber (110), a transfer pump (123) which transfers ammonium salt produced by reacting carbon dioxide included in exhaust gas flowed through the inlet (115) with the reaction solution, a mixing tank (130) which includes an impeller (135) that produces slurry including carbonate and an ammonia solution by reacting ammonium salt transferred from the wet scrubber (110) with bivalent metal oxide or bivalent metal hydroxide, the sludge pump (131) which transfers sludge from the mixing tank (130) to a solid-liquid separator (150), a solid-liquid separator (150) which separates precipitate such as carbonate and an ammonia solution from the sludge transferred from the mixing tank (130);
   a first storage tank (151) which stores an ammonia solution separated from the solid-liquid separator (150);

a second storage tank (160) which stores precipitate such as carbonate separated from the solid-liquid separator (150);

a third storage tank (140) which supplies bivalent metal oxide or bivalent metal hydroxide; and a transfer pump (152) which transfers an ammonia solution stored in the first storage tank (151) to the circulation tank (120).

2. The apparatus (100) of claim 1, wherein bivalent metal oxide is calcium oxide or magnesium oxide and bivalent metal hydroxide is calcium hydroxide or magnesium hydroxide.

3. The apparatus (100) of claim 1, wherein bivalent metal oxide or bivalent metal hydroxide is supplied in the form of powder, an aqueous solution, or sludge.

4. A vessel comprising:
a hull; and
an apparatus (100) for purifying exhaust gas of a vessel of claim 1 equipped with the hull.

5. A method of purifying exhaust gas of a vessel comprising:
  i) reacting carbon dioxide included in exhaust gas emitted from a vessel with water to produce carbonic acid ($H_2CO_3$) in step 1;
  ii) reacting carbonic acid produced in step 1 with an ammonia solution to produce ammonium hydrogen carbonate ($NH_4HCO_3$) in step 2;
  iii) reacting ammonium hydrogen carbonate ($NH_4HCO_3$) produced in step 2 with an ammonia solution to produce ammonium carbonate (($NH_4)_2CO_3$) in step 3;
  iv) reacting ammonium hydrogen carbonate ($NH_4HCO_3$) and ammonium carbonate ($(NH_4)_2CO_3$) with bivalent metal oxide or bivalent metal hydroxide to produce carbonate and an ammonia solution in step 4; and
  v) re-supplying the ammonia solution produced in step 4 to step 2 in step 5.

6. The method of claim 5, wherein an insufficient ammonia solution is generated through a reaction of an inorganic compound with calcium hydroxide and is filled.

7. The method of claim 6, wherein the inorganic compound comprises at least one selected from a group consisting of ammonium bicarbonate ($NH_4HCO_3$), ammonium carbonate (($NH_4)_2CO_3$), ammonium bisulfite ($NH_4HSO_4$), ammonium sulfate (($NH_4)_2SO_4$), ammonium nitrate ($NH_4NO_3$), ammonium chloride ($NH_4Cl$), ammonium sulfamate ($NH_4SO_3NH_2$), and ammonium sulfite (($NH_4)_2SO_3$).

8. The method of claim 6, wherein the amount of the inorganic compound needs to be put by 1.0 to 2.0 times at the molar ratio of insufficient ammonia solution.

9. A method of purifying exhaust gas of a vessel comprising:
  i) reacting carbon dioxide included in exhaust gas emitted from a vessel with water to produce carbonic acid ($H_2CO_3$) in step a (operation S100);
  ii) reacting sulfur dioxide included in exhaust gas with water to produce sulfurous acid ($H_2SO_3$) and sulfuric acid ($H_2SO_4$) in step b (operation S200);
  iii) reacting carbonic acid ($H_2CO_3$) produced in step a (operation S100) with sulfurous acid ($H_2SO_3$), sulfuric acid ($H_2SO_4$) produced in step b (operation S200), and a reaction solution to produce a reaction solution including mineral salt in step c (operation S300);
  iv) reacting the reaction solution including mineral salt produced in step c (operation S300) with bivalent metal oxide or bivalent metal hydroxide to produce carbonate and sulphate and to recycle a reaction solution at the same time in step d (operation S500); and
  v) separating carbonate and sulphate included in a recycled reaction solution by using a solid-liquid separator (1500) in step e (operation S600).

10. The method of claim 9, wherein the reaction solution is a sodium hydroxide aqueous solution, an ammonia aqueous solution, or a mixture thereof.

11. The method of claim 9, wherein the reaction solution further comprises at least any one of a lithium hydroxide aqueous solution, a potassium hydroxide aqueous solution, a calcium hydroxide aqueous solution, and a magnesium hydroxide aqueous solution as an auxiliary reaction solution.

12. The method of claim 11, wherein the concentration of the lithium hydroxide aqueous solution and the potassium hydroxide aqueous solution is below 15 weight % compared with the total reaction solution.

13. The method of claim 11, wherein the concentration of the calcium hydroxide aqueous solution and the magnesium hydroxide aqueous solution is below 2 weight % compared with the total reaction solution.

14. The method of claim of claim 9, wherein the reaction solution is produced by using pure water or seawater.

15. The method of claim 9, wherein the bivalent metal oxide is calcium oxide or magnesium oxide.

16. The method of claim 9, wherein the bivalent metal hydroxide is calcium hydroxide or magnesium hydroxide.

17. The method of claim 9, wherein the bivalent metal oxide or bivalent metal hydroxide is supplied in the form of powder, an aqueous solution, or sludge.

18. A vessel comprising:
a hull; and
an apparatus (100) for purifying exhaust gas of a vessel of claim 2 equipped with the hull.

19. A vessel comprising:
a hull; and
an apparatus (100) for purifying exhaust gas of a vessel of claim 3 equipped with the hull.

* * * * *